United States Patent
Terada

(10) Patent No.: US 11,318,573 B2
(45) Date of Patent: May 3, 2022

(54) TRANSFER JIG AND CUTTING BLADE CHANGING METHOD

(71) Applicant: DISCO CORPORATION, Tokyo (JP)

(72) Inventor: Kazuki Terada, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 237 days.

(21) Appl. No.: 16/406,211

(22) Filed: May 8, 2019

(65) Prior Publication Data
US 2019/0358757 A1 Nov. 28, 2019

(30) Foreign Application Priority Data
May 25, 2018 (JP) .............................. JP2018-100900

(51) Int. Cl.
| | |
|---|---|
| B28D 5/02 | (2006.01) |
| B23Q 3/157 | (2006.01) |
| B23Q 3/155 | (2006.01) |
| B28D 5/00 | (2006.01) |

(52) U.S. Cl.
CPC ...... *B23Q 3/15503* (2016.11); *B23Q 3/15773* (2013.01); *B28D 5/0082* (2013.01); *B28D 5/029* (2013.01); *B23Q 2003/155407* (2016.11); *Y10T 483/10* (2015.01); *Y10T 483/16* (2015.01); *Y10T 483/1736* (2015.01)

(58) Field of Classification Search
CPC ............. Y10T 483/16; Y10T 483/1733; Y10T 483/1736; Y10T 483/174; Y10T 483/1748; Y10T 483/1776; Y10T 483/1779; Y10T 483/1783; Y10T 483/1788; Y10T 483/10; B23Q 3/1554; B23Q 3/15773; B23Q 2003/155404; B23Q 2003/155407; B23Q 3/15503; B28D 5/0082

USPC ..... 483/14, 30, 31, 33, 36, 48, 49, 51, 53, 1
See application file for complete search history.

(56) References Cited

U.S. PATENT DOCUMENTS

| | | | | |
|---|---|---|---|---|
| 6,030,326 A | * | 2/2000 | Azuma | B27B 5/32 483/31 |
| 6,341,600 B1 | * | 1/2002 | Wakita | B23D 61/10 125/13.01 |
| 6,666,748 B2 | * | 12/2003 | Hiramoto | B23Q 3/15773 125/11.03 |
| 9,636,844 B2 | * | 5/2017 | Wakita | B27B 5/32 |

(Continued)

FOREIGN PATENT DOCUMENTS

JP 2007208114 A 8/2007

OTHER PUBLICATIONS

EPO Machine Translation of JP 2007208114 A—"Cutting Device"; Sekiya, Kazuma; Aug. 16, 2007.*

*Primary Examiner* — Erica E Cadugan
*Assistant Examiner* — Michael Vitale
(74) *Attorney, Agent, or Firm* — Greer Burns & Crain, Ltd.

(57) ABSTRACT

A transfer jig for use in transferring a new cutting blade as a replacement component to the processing unit, in a cutting apparatus including a chuck table holding a workpiece, a processing unit having a spindle and a cutting blade detachably mounted on the spindle, a cutting blade changing unit changing the cutting blade, and a transfer mechanism supplying the workpiece to the processing unit. The transfer jig has a plurality of receiving portions each adapted to receive the new cutting blade and the cutting blade changed by the cutting blade changing unit. The transfer jig is adapted to be transferred by the transfer mechanism transferring the workpiece.

12 Claims, 22 Drawing Sheets

(56) References Cited

U.S. PATENT DOCUMENTS

| | | | |
|---|---|---|---|
| 2014/0243176 A1* | 8/2014 | Kosonen | B23Q 3/15513 483/1 |
| 2015/0020670 A1* | 1/2015 | Wakita | H01L 21/304 83/522.12 |
| 2016/0207216 A1* | 7/2016 | Nitta | B23B 31/307 |
| 2016/0346956 A1* | 12/2016 | Takekawa | B23Q 17/10 |
| 2017/0239833 A1* | 8/2017 | Mazzaccherini | B23Q 3/1574 |
| 2019/0070701 A1* | 3/2019 | Sekiya | B23Q 3/15513 |

\* cited by examiner

1

TRANSFER JIG AND CUTTING BLADE CHANGING METHOD

BACKGROUND OF THE INVENTION

Field of the Invention

The present invention relates to a transfer jig and a cutting blade changing method.

Description of the Related Art

In cutting a workpiece such as a semiconductor wafer, a cutting apparatus including a cutting blade is used as a processing apparatus (see Japanese Patent Laid-Open No. 2007-208114, for example). In the cutting apparatus mentioned above, the cutting blade as a consumable component must be automatically supplied in order to continuously perform the operation.

Accordingly, the cutting apparatus described in Japanese Patent Laid-Open No. 2007-208114 includes a blade rack holding a plurality of new cutting blades and a blade changing mechanism changing the old cutting blade mounted on a cutting unit with one of the plural new cutting blades held by the blade rack.

SUMMARY OF THE INVENTION

However, in the cutting apparatus described in Japanese Patent Laid-Open No. 2007-208114, the old cutting blade removed from the cutting unit by the blade changing mechanism is held by the blade rack, and this old cutting blade held by the blade rack is manually changed by the new cutting blade by an operator. As a result, the number of steps required for replacement of the cutting blade in this cutting apparatus tends to increase.

It is therefore an object of the present invention to provide a transfer jig and a cutting blade changing method which can reduce the number of steps required for replacement of the cutting blade.

In accordance with an aspect of the present invention, there is provided, in a cutting apparatus including a chuck table holding a workpiece, a processing unit having a spindle and a cutting blade detachably mounted on the spindle, transfer means supplying the workpiece to the processing unit, and cutting blade changing means changing the cutting blade, a transfer jig for use in transferring a new cutting blade as a replacement component to the processing unit. The transfer jig has a plurality of receiving portions each adapted to receive the new cutting blade and the cutting blade changed by the cutting blade changing means. The transfer jig is adapted to be transferred by the transfer means transferring the workpiece.

In accordance with another aspect of the present invention, there is provided, in a cutting apparatus including a chuck table holding a workpiece, a processing unit having a spindle and a cutting blade detachably mounted on the spindle, transfer means supplying the workpiece to the processing unit, and cutting blade changing means changing the cutting blade, a cutting blade changing method using a transfer jig having a plurality of receiving portions each adapted to receive a new cutting blade as a replacement component and the cutting blade changed by the cutting blade changing means. The cutting blade changing method includes a transfer step of transferring the transfer jig previously stored in a cassette to the processing unit by using the transfer means in the condition where the new cutting blade is received in one of the receiving portions of the transfer jig; a transfer jig holding step of holding the transfer jig above the chuck table by using transfer jig holding means after performing the transfer step; a removing step of removing the cutting blade from the processing unit by using the cutting blade changing means and next placing the removed cutting blade into another one of the receiving portions of the transfer jig, after performing the transfer jig holding step; a mounting step of taking the new cutting blade from one of the receiving portions of the transfer jig by using the cutting blade changing means and next mounting the new cutting blade to the processing unit, after performing the removing step; and a returning step of returning the transfer jig from the processing unit to the cassette by using the transfer means in the condition where the cutting blade removed from the processing unit is received in another one of the receiving portions of the transfer jig, after performing the mounting step.

The present invention can exhibit an effect that the number of steps required for replacement of the cutting blade can be reduced.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Preferred embodiments of the present invention will now be described in detail with reference to the drawings. The present invention is not limited to the preferred embodiments. Further, the components used in this preferred embodiments may include those that can be easily assumed by persons skilled in the art or substantially the same elements as those known in the art. Further, the configurations described below may be suitably combined. Further, the configurations may be variously omitted, replaced, or changed without departing from the scope of the present invention.

First Preferred Embodiment

Figure 1:
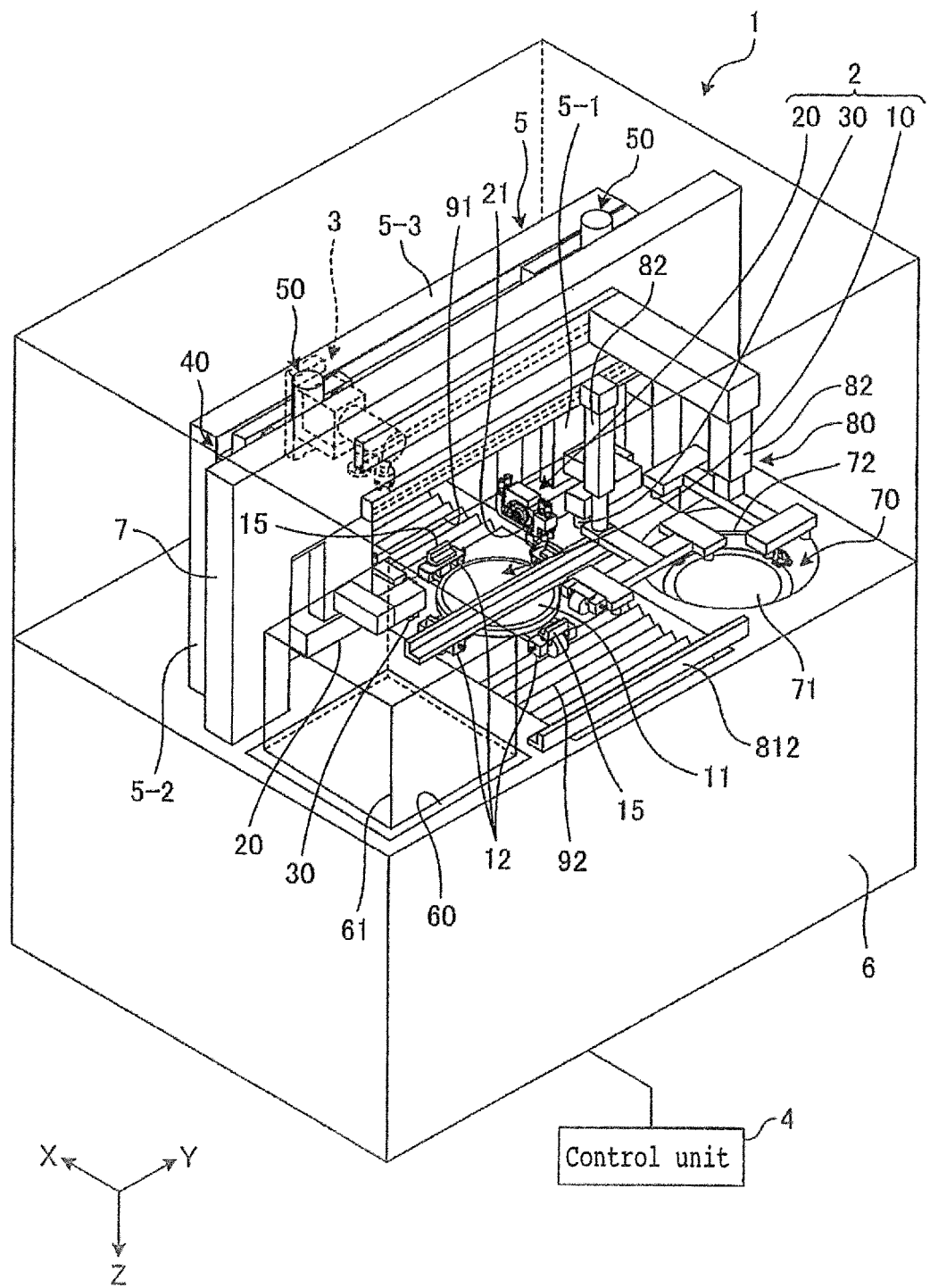
FIG. 1 is a perspective view depicting the configuration of a cutting apparatus for performing a cutting blade changing method according to a first preferred embodiment of the present invention.
Figure 2:
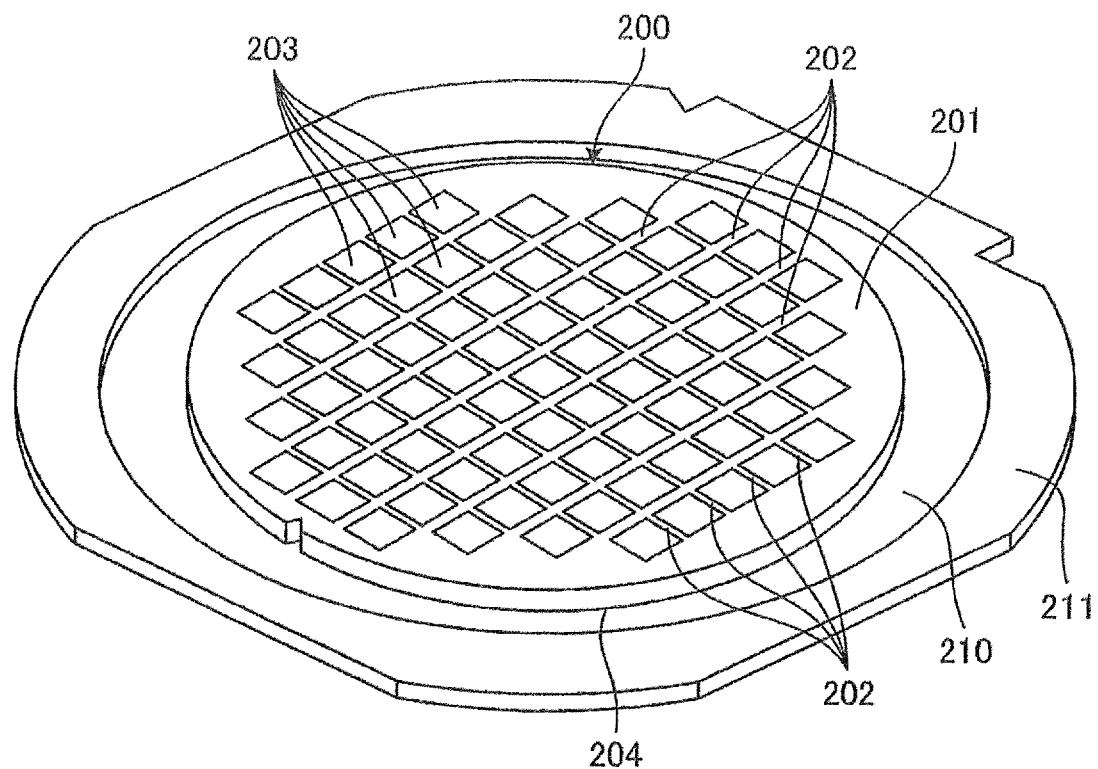
FIG. 2 is a perspective view of a workpiece to be processed by the cutting apparatus depicted in FIG. 1.
Figure 3:
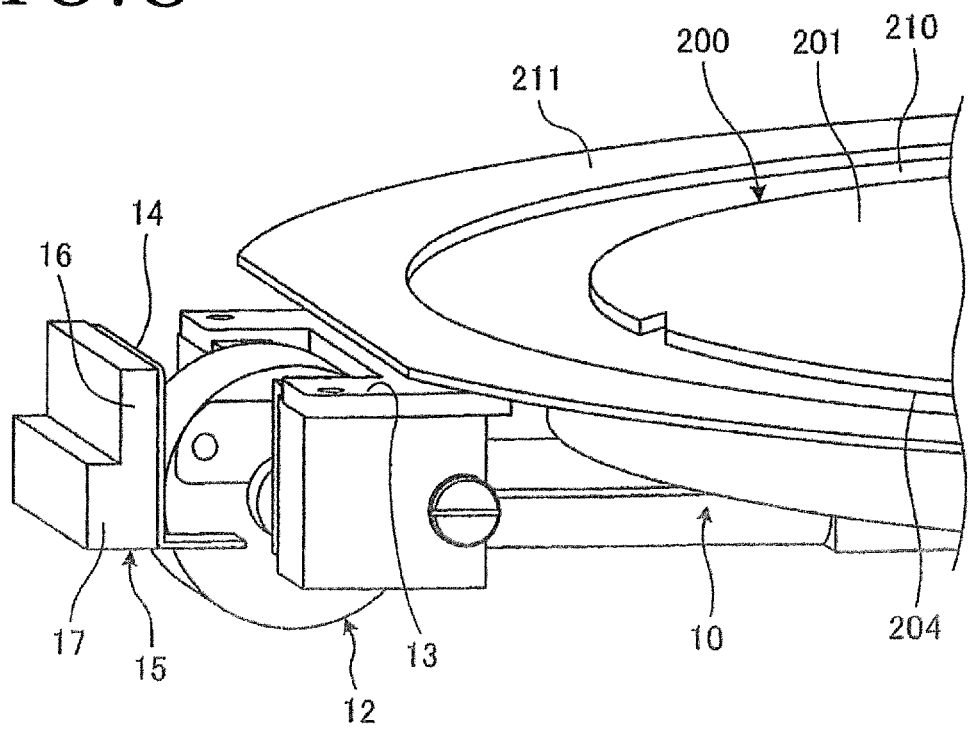
FIG. 3 is a perspective view depicting an essential part of a chuck table included in the cutting apparatus depicted in FIG. 1.
Figure 4:
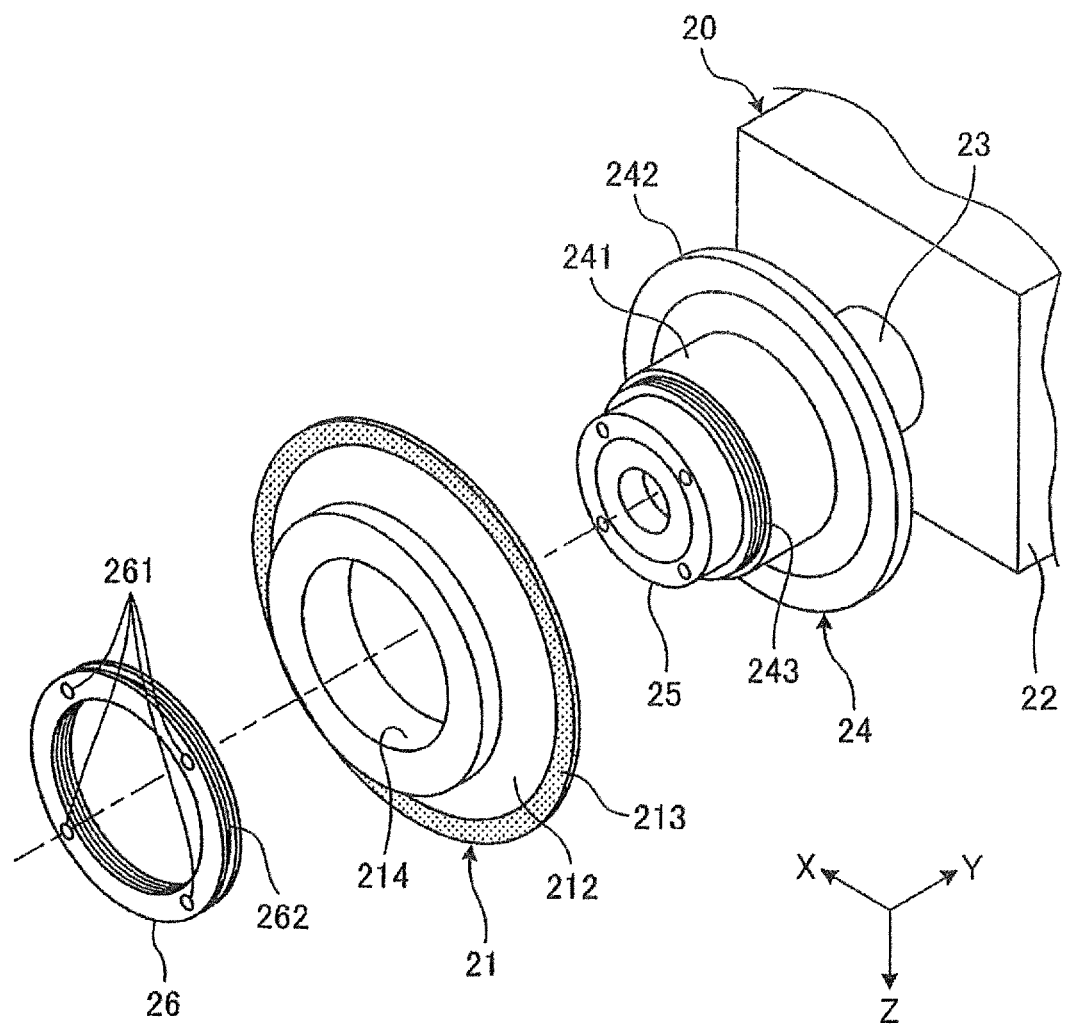
FIG. 4 is an exploded perspective view of a cutting unit included in the cutting apparatus depicted in FIG. 1.
Figure 5:
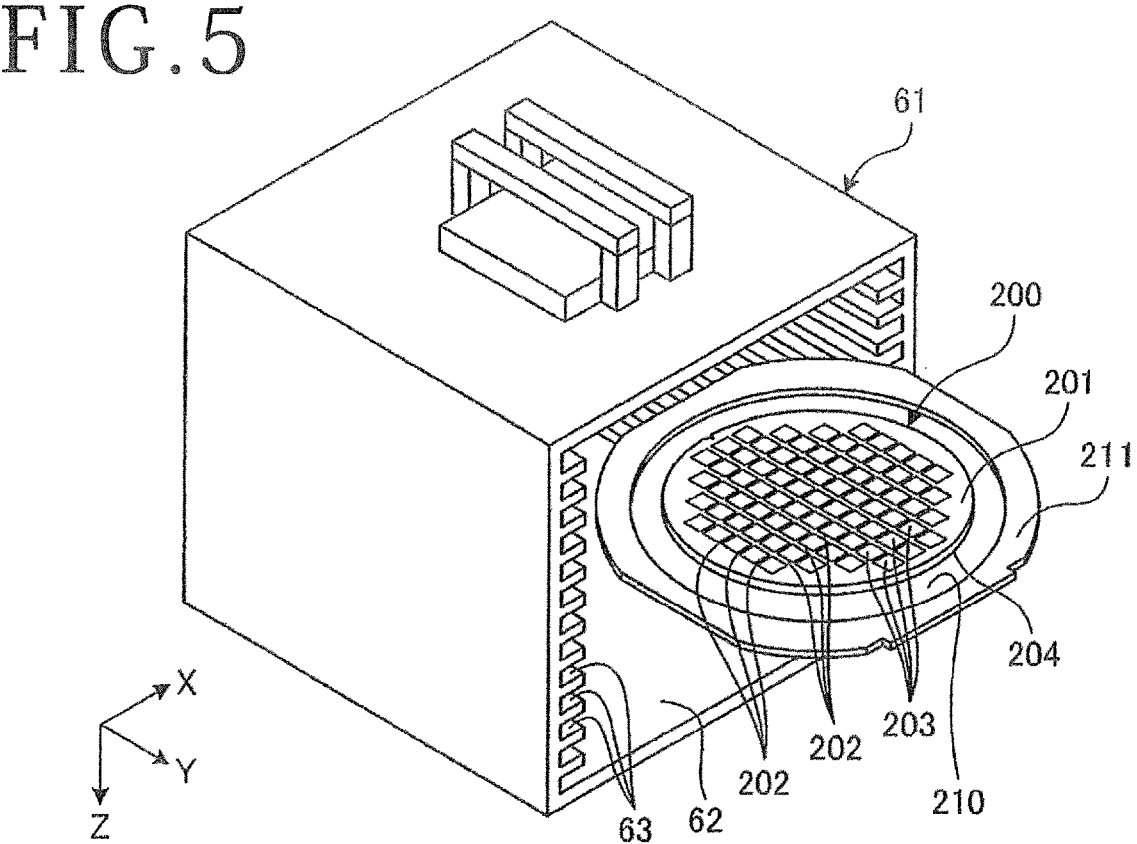
FIG. 5 is a perspective view depicting a cassette to be set on a cassette elevator included in the cutting apparatus depicted in FIG. 1.
Figure 6:
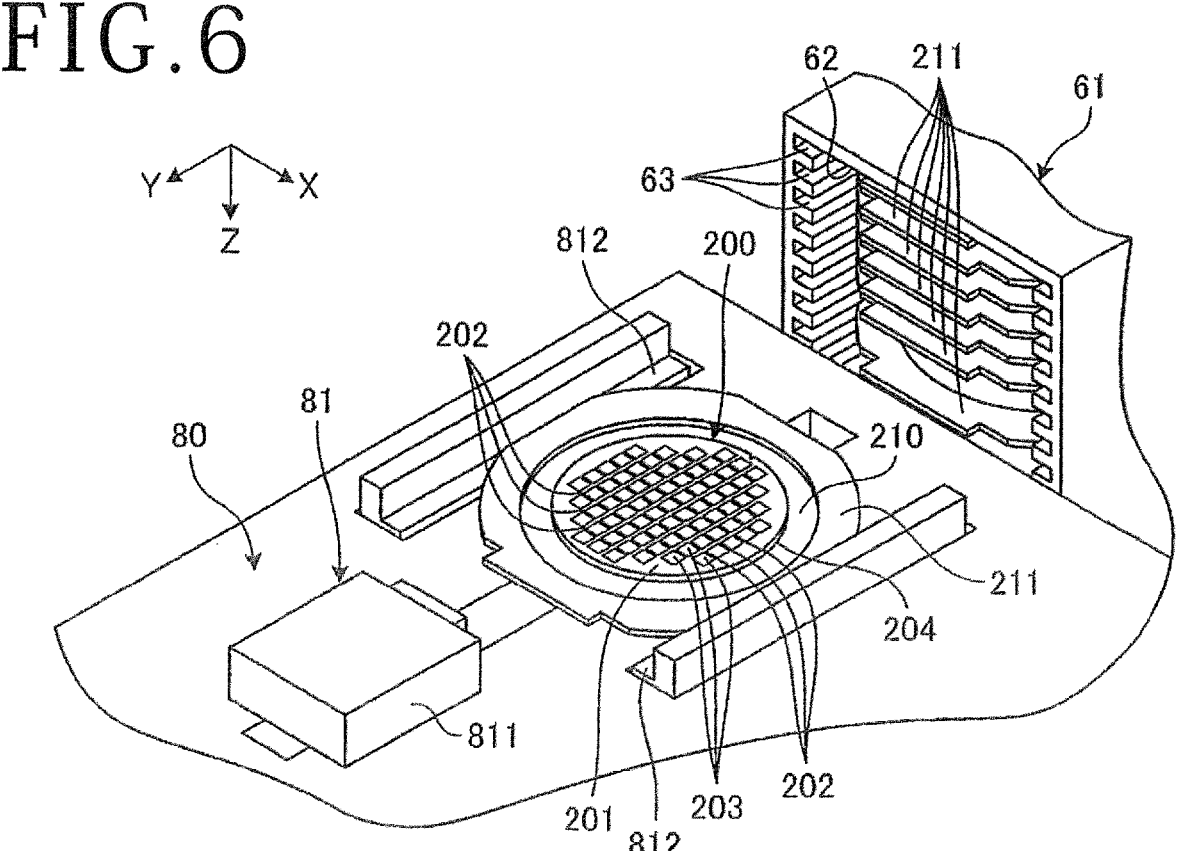
FIG. 6 is a perspective view depicting a temporary setting unit constituting a transfer unit included in the cutting apparatus depicted in FIG. 1.
Figure 7:
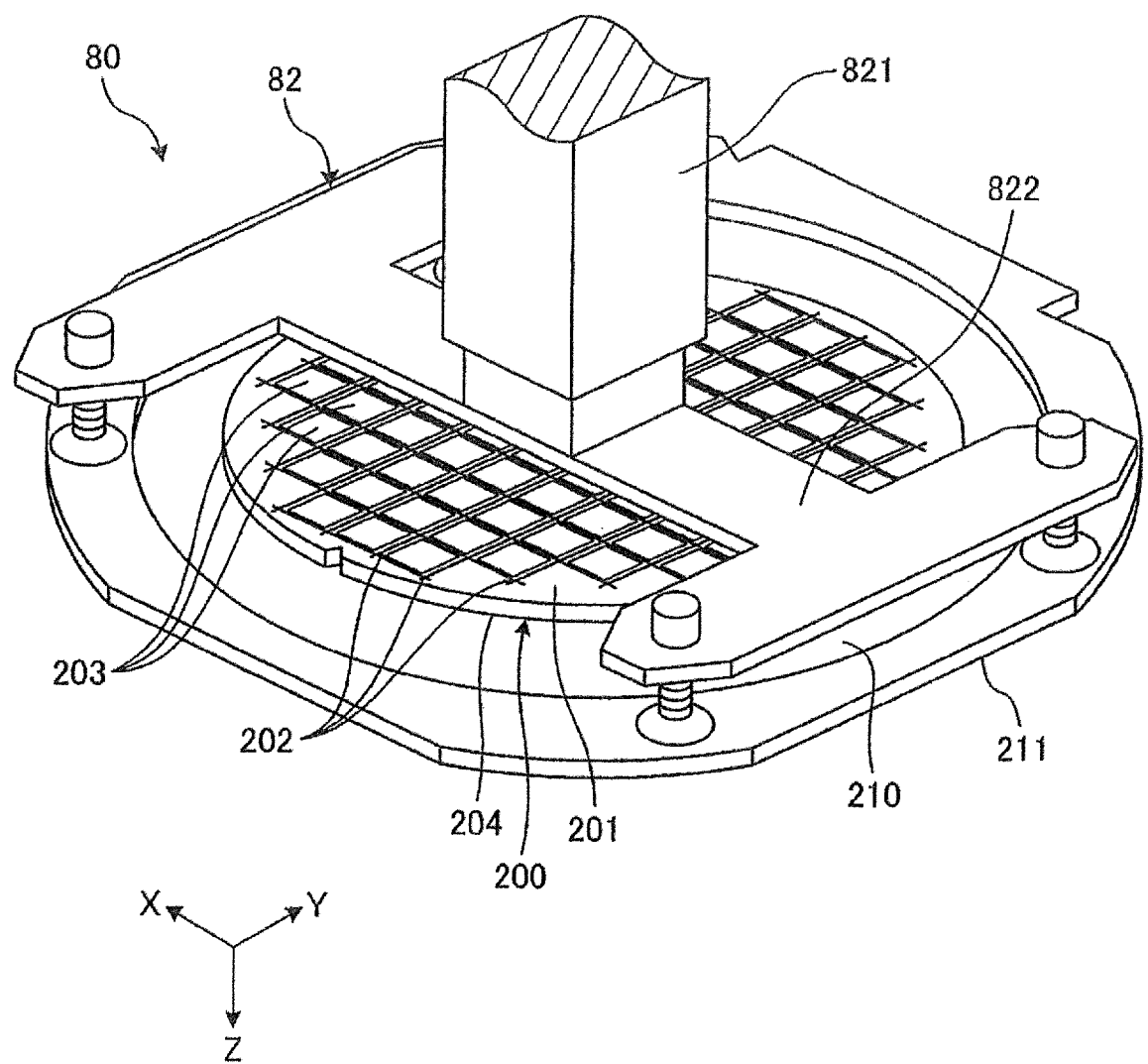
FIG. 7 is a perspective view depicting a transfer arm constituting the transfer unit included in the cutting apparatus depicted in FIG. 1.
Figure 8:
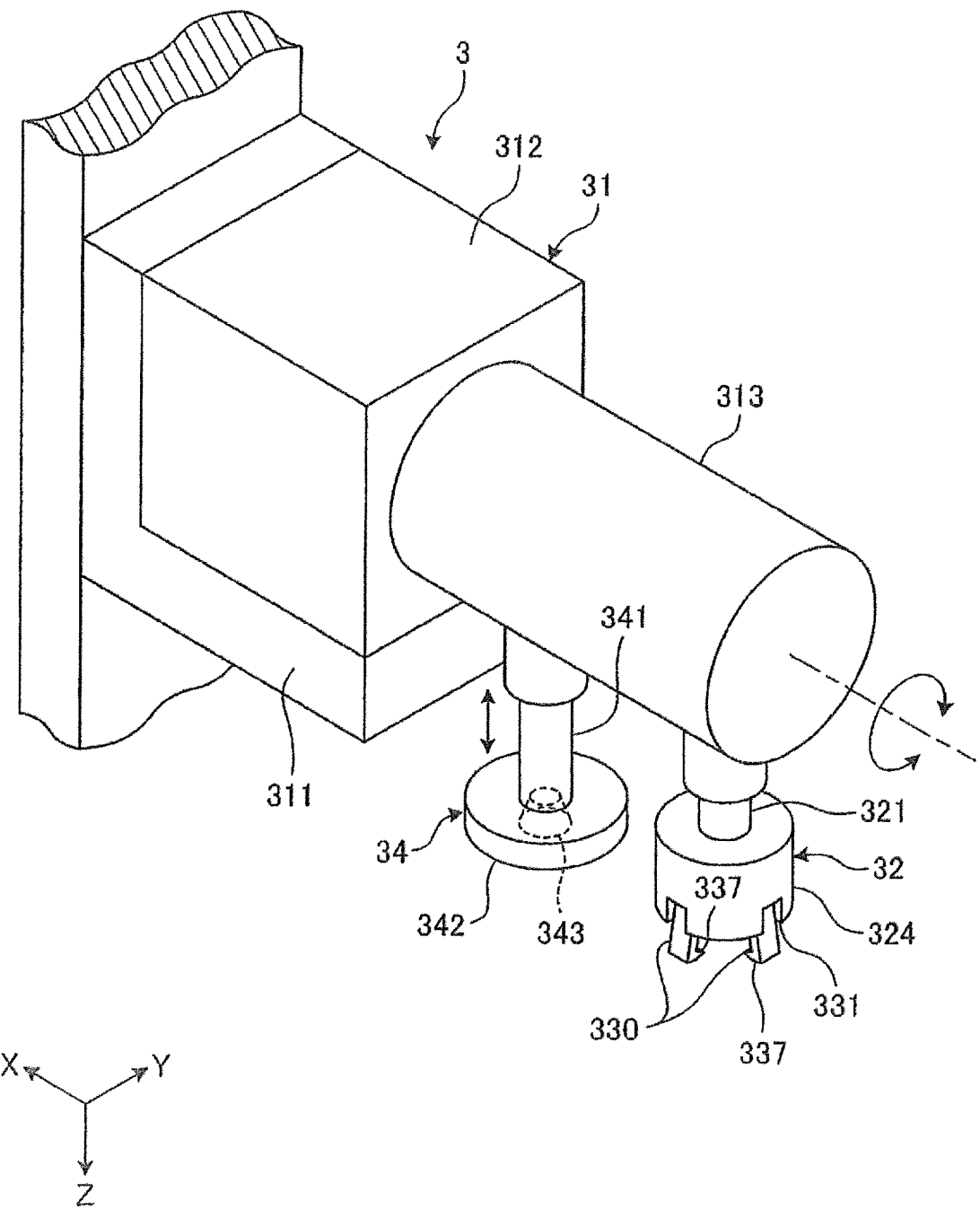
FIG. 8 is a perspective view depicting the configuration of a blade changing unit included in the cutting apparatus depicted in FIG. 1.
Figure 9:
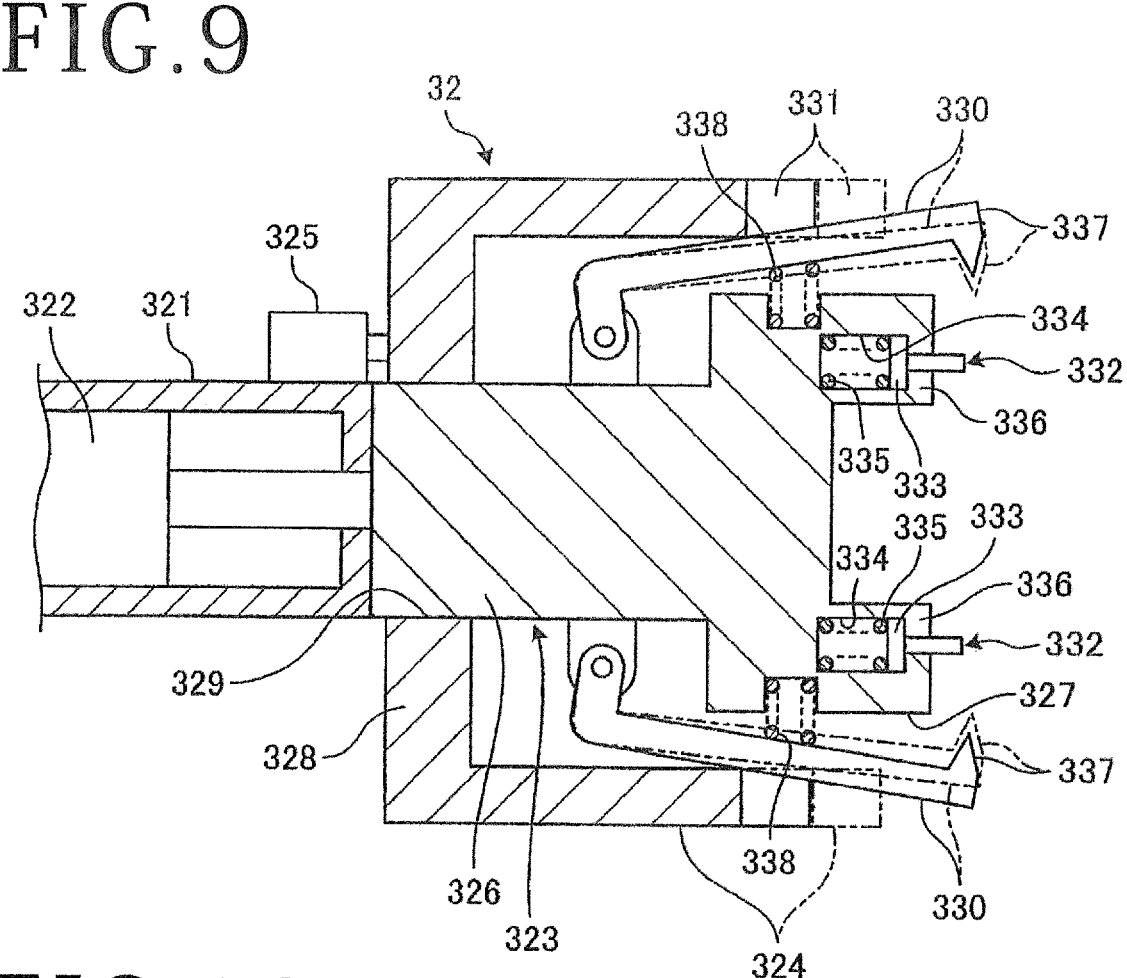
FIG. 9 is a sectional view of a nut holder included in the blade changing unit depicted in FIG. 8.

A transfer jig and a cutting blade changing method according to a first preferred embodiment of the present invention will now be described with reference to the drawings. FIG. 1 is a perspective view depicting the configuration of a cutting apparatus for performing the cutting blade changing method according to the first preferred embodiment. FIG. 2 is a perspective view of a workpiece to be processed by the cutting apparatus depicted in FIG. 1. FIG. 3 is a perspective view depicting an essential part of a chuck table included in the cutting apparatus depicted in FIG. 1. FIG. 4 is an exploded perspective view of a cutting unit included in the cutting apparatus depicted in FIG. 1. FIG. 5 is a perspective view depicting a cassette to be set on a cassette elevator included in the cutting apparatus depicted in FIG. 1. FIG. 6 is a perspective view depicting a temporary setting unit constituting a transfer unit included in the cutting apparatus depicted in FIG. 1. FIG. 7 is a perspective view depicting a transfer arm constituting the transfer unit included in the cutting apparatus depicted in FIG. 1. FIG. 8 is a perspective view depicting the configuration of a blade changing unit included in the cutting apparatus depicted in FIG. 1. FIG. 9 is a sectional view of a nut holder included in the blade changing unit depicted in FIG. 8.

(Cutting Apparatus)

The cutting blade changing method according to the first preferred embodiment is performed by a cutting apparatus 1 depicted in FIG. 1. The cutting apparatus 1 is an apparatus for cutting (processing) a workpiece 200 depicted in FIG. 2. In the first preferred embodiment, the workpiece 200 is a disk-shaped wafer such as a semiconductor wafer and an optical device wafer, in which the wafer is formed of silicon, sapphire, or gallium arsenide, for example, as a base material. The workpiece 200 has a front side 201 and a back side 204. A plurality of crossing division lines 202 are formed on the front side 201 of the workpiece 200 to thereby define a plurality of separate regions where a plurality of devices 203 are respectively formed.

As a modification, the workpiece 200 may be a so-called TAIKO (registered trademark) wafer having a thin central portion and a thick peripheral portion. Further, the workpiece 200 may be a rectangular package substrate having a plurality of devices sealed with resin, rather than a disk-shaped wafer. Further, the workpiece 200 may be a ceramic substrate, a ferrite substrate, or a substrate containing at least one of nickel and iron, for example. In the first preferred embodiment, the back side 204 of the workpiece 200 is attached to the central portion of an adhesive tape 210, and an annular frame 211 is mounted on the peripheral portion of the adhesive tape 210. Thus, the workpiece 200 is supported through the adhesive tape 210 to the annular frame 211.

The cutting apparatus 1 depicted in FIG. 1 is an apparatus for cutting (processing) the workpiece 200 along the division lines 202 by using a cutting blade 21 in the condition where the workpiece 200 is held on a chuck table 10. As depicted in FIG. 1, the cutting apparatus 1 includes a processing unit 2 for cutting the workpiece 200, a blade changing unit 3 as cutting blade changing means for changing the cutting blade 21 as a consumable component, and a control unit 4. The processing unit 2 includes the chuck table 10 having a holding surface 11 for holding the workpiece 200 under suction, a pair of cutting units 20 each having the cutting blade 21 for cutting the workpiece 200 held on the chuck table 10, the cutting blade 21 being mounted on a spindle 23, and a pair of imaging units 30 for imaging the workpiece 200 held on the chuck table 10.

As depicted in FIG. 1, the cutting apparatus 1 further includes an X moving unit (not depicted) for moving (feeding) the chuck table 10 in the X direction depicted by an arrow X, the X direction being parallel to a horizontal direction, a pair of Y moving units 40 for respectively moving (indexing) the pair of cutting units 20 in the Y direction depicted by an arrow Y, the Y direction being parallel to a horizontal direction and perpendicular to the X direction, and a pair of Z moving units 50 for respectively moving (feeding) the pair of cutting units 20 in the Z direction depicted by an arrow Z, the Z direction being parallel to a vertical direction perpendicular to both the X direction and the Y direction. Thus, the cutting apparatus 1 is a dual spindle type dicing saw having the two cutting units 20, or a so-called facing dual type cutting apparatus.

The chuck table 10 is a disk-shaped member, and the holding surface 11 for holding the workpiece 200 is formed of porous ceramic, for example. The chuck table 10 is movable in the X direction by the X moving unit between a processing area 91 defined below the cutting units 20 and a standby area 92 spaced from the position below the cutting units 20. That is, the workpiece 200 held on the chuck table 10 is cut in the processing area 91, and the workpiece 200 is loaded to the chuck table 10 in the standby area 92 before cutting and is unloaded from the chuck table 10 in the standby area 92 after cutting. The chuck table 10 is also rotatable about its axis parallel to the Z direction by a rotational drive source (not depicted). The chuck table 10 is connected to a vacuum source (not depicted), so that the workpiece 200 can be held on the holding surface 11 under suction by a vacuum applied from the vacuum source as depicted in FIG. 3. In the first preferred embodiment, the back side 204 of the workpiece 200 is sucked through the adhesive tape 210 to the holding surface 11 of the chuck table 10. As depicted in FIGS. 1 and 3, a plurality of clamps 12 for clamping the annular frame 211 are provided around the chuck table 10. In FIG. 3, the devices 203 formed on the front side 201 of the workpiece 200 are not depicted.

As depicted in FIG. 3, each clamp 12 includes a body portion 13 for mounting the annular frame 211 thereon and a clamping member 14 for clamping the annular frame 211 in cooperation with the body portion 13. The clamping member 14 is rotatable about a horizontal axis between a clamping position where the annular frame 211 mounted on the body portion 13 is clamped by the clamping member 14 and an unclamping position where the clamped condition of the annular frame 211 is canceled so as to be spaced from the body portion 13 as depicted in FIG. 3. The clamping member 14 is rotatable between the clamping position and the unclamping position outside the outer circumference of the chuck table 10. In the unclamping position, the clamping member 14 allows the workpiece 200 to be mounted on the holding surface 11 and also allows the workpiece 200 to be demounted from the holding surface 11, without the contact between the clamping member 14 and the annular frame 211. In the first preferred embodiment, the clamping member 14 is rotationally driven by a drive source such as an air cylinder so as to take either the clamping position or the unclamping position.

Each clamping member 14 is provided with a transfer jig holding member 15 as transfer jig holding means. The transfer jig holding member 15 is composed of a flat portion 16 and a step portion 17 projecting from the flat portion 16 in an integral manner. The flat portion 16 is mounted on the upper surface of each clamping member 14 in the clamping position. In this position, the flat portion 16 has a flat upper surface for mounting a transfer jig to be hereinafter described. Further, in this position, the step portion 17 preferably has an inner surface along the outer circumference of the annular frame 211. The inner surface of the step portion 17 is adapted to abut against the outer circumference of the transfer jig as will be described later.

As depicted in FIG. 4, each cutting unit 20 is cutting means having the cutting blade 21 for cutting the workpiece 200 held on the chuck table 10, in which the cutting blade 21 is detachably mounted on the spindle 23. Each cutting unit 20 is movable in the Y direction by the corresponding Y moving unit 40 and also movable in the Z direction by the corresponding Z moving unit 50, relative to the workpiece 200 held on the chuck table 10.

As depicted in FIG. 1, a double column type support frame 5 is provided on the upper surface of a base housing 6 so as to stand upright therefrom. The support frame 5 is composed of a pair of columns 5-1 and 5-2 standing from the upper surface of the base housing 6 and a horizontal bar 5-3 connecting the upper ends of the columns 5-1 and 5-2. One of the two cutting units 20 is supported through the corresponding Y moving unit 40 and the corresponding Z moving unit 50 to the column 5-1. The other cutting unit 20 is supported through the corresponding Y moving unit 40 and the corresponding Z moving unit 50 to the column 5-2.

Each cutting unit 20 is adapted to be moved by the corresponding Y moving unit 40 and the corresponding Z moving unit 50, thereby setting the corresponding cutting blade 21 at an arbitrary position on the holding surface 11 of the chuck table 10.

As depicted in FIG. 4, each cutting unit 20 includes a spindle housing 22 movable in the Y direction and the Z direction by the corresponding Y moving unit 40 and the corresponding Z moving unit 50, the spindle 23 rotatably supported to the spindle housing 22 so as to be rotated about a horizontal axis by a motor (not depicted), and a blade mounting member 24 mounted on the front end portion of the spindle 23. Each cutting unit 20 further includes a fixing nut 25 adapted to thereby engage an external thread (not depicted) formed on the outer circumference of the front end portion of the spindle 23, thereby fixing the blade mounting member 24 to the front end portion of the spindle 23. Each cutting unit 20 further includes the cutting blade 21 adapted to be mounted on the blade mounting member 24 and a fastening nut 26 for fastening the cutting blade 21 in the condition where the cutting blade 21 is sandwiched between the fastening nut 26 and the blade mounting member 24.

The blade mounting member 24 includes a cylindrical mounting portion 241 and a flange portion 242 formed at one end portion of the mounting portion 241 on the side opposed to the spindle housing 22. The flange portion 242 is an annular portion having an outer diameter larger than that of the mounting portion 241. Further, an external thread 243 is formed on the outer circumference of the other end portion of the mounting portion 241.

The cutting blade 21 is a thin ringlike cutting wheel. In the first preferred embodiment, the cutting blade 21 is a so-called hub blade including an annular support base 212 formed of metal such as aluminum alloy and an annular cutting edge 213 fixed to the outer circumference of the support base 212 for cutting the workpiece 200. The support base 212 has a central mounting hole 214 for mounting the cutting blade 21 on the mounting portion 241 of the blade mounting member 24. That is, the mounting portion 241 of the blade mounting member 24 is inserted through the mounting hole 214 of the support base 212 of the cutting blade 21. The cutting edge 213 is composed of abrasive grains of diamond or cubic boron nitride (CBN), for example, and a bond (binder) of metal or resin, for example, for fixing the abrasive grains. The cutting edge 213 has a predetermined thickness. As a modification, the cutting blade 21 may be a washer blade composed of only the cutting edge 213.

In mounting the cutting blade 21 on the spindle 23, the mounting hole 214 of the support base 212 is engaged with the outer circumference of the cylindrical mounting portion 241 of the blade mounting member 24. Thereafter, the fastening nut 26 is threadedly engaged with the external thread 243 formed on the cylindrical mounting portion 241, thereby fastening the cutting blade 21 in the condition where the cutting blade 21 is sandwiched between the flange portion 242 of the blade mounting member 24 and the fastening nut 26. Further, the fastening nut 26 has four pin engaging holes 261 arranged at equal intervals along the outer circumference of the fastening nut 26. Each pin engaging hole 261 is formed on the end surface of the fastening nut 26 so as to extend through the thickness thereof. Further, an annular groove 262 is formed on the whole of the outer circumference of the fastening nut 26.

The axis of the spindle 23 of each cutting unit 20, i.e., the axis of the cutting blade 21 of each cutting unit 20 is set parallel to the Y direction.

Each imaging unit 30 is fixed to the corresponding cutting unit 20 so as to be movable together therewith. Each imaging unit 30 includes an imaging element for imaging a target area of the workpiece 200 held on the chuck table 10 before cutting, in which the target area is an area to be divided (cut) by the corresponding cutting blade 21. For example, the imaging element is a charge-coupled device (CCD) imaging element or a complementary metal-oxide semiconductor (CMOS) imaging element. Each imaging unit 30 functions to image the workpiece 200 held on the chuck table 10 to obtain an image for use in performing the alignment between the workpiece 200 and the corresponding cutting blade 21, then outputting this image (image signal) to the control unit 4.

The X moving unit functions to move the chuck table 10 in the X direction as a work feeding direction, thereby relatively moving the chuck table 10 and each cutting unit 20 in the X direction. Each Y moving unit 40 functions to move the corresponding cutting unit 20 in the Y direction as an indexing direction, thereby relatively moving the chuck table 10 and the corresponding cutting unit 20 in the Y direction. Each Z moving unit 50 functions to move the corresponding cutting unit 20 in the Z direction as a cutter feeding direction, thereby relatively moving the chuck table 10 and the corresponding cutting unit 20 in the Z direction.

Although not depicted, the X moving unit includes a known ball screw rotatable about its axis extending in the X direction, a known motor for rotating the ball screw about its axis, and a pair of parallel guide rails for movably supporting the chuck table 10 in such a manner that the chuck table 10 is movable in the X direction by rotating the ball screw. Similarly, each Y moving unit 40 includes a known ball screw rotatable about its axis extending in the Y direction, a known motor for rotating this ball screw about its axis, and a pair of parallel guide rails for movably supporting the corresponding cutting unit 20 in such a manner that the cutting unit 20 is movable in the Y direction by rotating this ball screw. Similarly, each Z moving unit 50 includes a known ball screw rotatable about its axis extending in the Z direction, a known motor for rotating this ball screw about its axis, and a pair of parallel guide rails for movably supporting the corresponding cutting unit 20 in such a manner that the cutting unit 20 is movable in the Z direction by rotating this ball screw.

Although not depicted, the cutting apparatus 1 further includes an X position detecting unit for detecting the X position of the chuck table 10 as the position in the X direction, a Y position detecting unit for detecting the Y position of each cutting unit 20 as the position in the Y direction, and a Z position detecting unit for detecting the Z position of each cutting unit 20 as the position in the Z direction. The X position detecting unit may be composed of a linear scale parallel to the X direction and a read head for reading the linear scale. Similarly, the Y position detecting unit may be composed of a linear scale parallel to the Y direction and a read head for reading this linear scale. The Z position detecting unit may be configured by using the pulses output from the motor included in each Z moving unit 50 to thereby detect the Z position of each cutting unit 20 according to the output pulses. Detection signals output from the X position detecting unit, the Y position detecting unit, and the Z position detecting unit are transmitted to the control unit 4.

The cutting apparatus 1 further includes a cassette elevator 60 for mounting a cassette 61 on the upper surface thereof and moving the cassette 61 in the Z direction, a cleaning unit 70 for cleaning the workpiece 200 after cutting, and a transfer unit 80 as transfer means for taking the workpiece 200 out of the cassette 61 before cutting, storing the workpiece 200 into the cassette 61 after cutting, and transferring the workpiece 200. A plurality of workpieces 200 to be cut are previously stored in the cassette 61, and these workpieces 200 are adapted to be returned into the cassette 61 after cutting.

As depicted in FIG. 5, the cassette 61 is a boxlike container for storing the workpiece 200. The cassette 61 has a front opening 62 for allowing the pass of the workpiece 200 in taking the workpiece 200 out of the cassette 61 before cutting or storing the workpiece 200 into the cassette 61 after cutting. The cassette 61 further has a plurality of slots 63 for supporting a plurality of workpieces 200 in such a manner that these workpieces 200 are spaced from each other in the Z direction. The cassette 61 is placed on the upper surface of the cassette elevator 60 in the condition where the front opening 62 is opposed to the standby area 92.

The cleaning unit 70 includes a spinner table 71 for holding the workpiece 200 under suction, the spinner table 71 being rotatable about its axis parallel to the Z direction, and a cleaning water nozzle 72 for supplying a cleaning water to the workpiece 200 held on the spinner table 71.

The transfer unit 80 functions to supply the workpiece 200 to the processing unit 2 and also transfer the workpiece 200 among the cassette 61, the chuck table 10, and the cleaning unit 70. The transfer unit 80 includes a temporary setting unit 81 depicted in FIG. 6 and two transfer arms 82 having substantially the same configuration, one of the two transfer arms 82 being depicted in FIG. 7.

The temporary setting unit 81 functions to take one of the workpieces 200 out of the cassette 61 before cutting and also store the workpiece 200 into the cassette 61 after cutting. As depicted in FIG. 6, the temporary setting unit 81 includes a handling unit 811 for handling the workpiece 200 to linearly transfer the same and a pair of rails 812 for temporarily setting the workpiece 200 thereon before and after cutting. The handling unit 811 is so configured as to hold the annular frame 211 supporting the workpiece 200 in taking the workpiece 200 out of the cassette 61 before cutting and in storing the workpiece 200 into the cassette 61 after cutting.

The two transfer arms 82 function to transfer the workpiece 200 among the rails 812, the chuck table 10, and the spinner table 71. As depicted in FIG. 1, a double column type second support frame 7 is provided on the upper surface of the base housing 6 so as to stand upright therefrom. The second support frame 7 is located adjacent to the support frame 5 on the standby area 92 side. The two transfer arms 82 are supported to the second support frame 7 so as to be movable in the Y direction.

As depicted in FIG. 7, each transfer arm 82 has an arm portion 821 movable in the Y direction and a holding portion 822 for holding the workpiece 200, the holding portion 822 being connected to the lower end portion of the arm portion 821 so as to be movable in the Z direction. That is, the holding portion 822 is vertically movable relative to the arm portion 821. In the first preferred embodiment, the holding portion 822 of each transfer arm 82 is so configured as to hold the annular frame 211 under suction as depicted in FIG. 7, thereby holding the workpiece 200. In supplying the workpiece 200 from the cassette 61 to the processing unit 2, the temporary setting unit 81 of the transfer unit 80 is operated to draw the workpiece 200 from the cassette 61 and then temporarily set the workpiece 200 on the rails 812, and one of the two transfer arms 82 is next operated to transfer the workpiece 200 from the rails 812 to the chuck table 10.

As depicted in FIG. 1, the blade changing unit 3 is located behind the support frame 5 near the processing area 91. As depicted in FIG. 8, the blade changing unit 3 includes a unit body 31, a nut holder 32, and a blade chuck 34. In the first preferred embodiment, the single nut holder 32 and the single blade chuck 34 are included in the blade changing unit 3.

The unit body 31 includes an L-shaped support table 311 located behind the support frame 5 as viewed in FIG. 1. The support table 311 is movable in the Z direction. The support table 311 is also movable in the X direction by a moving unit (not depicted). The moving unit for moving the support table 311 in the X direction is configured similarly to the moving units 40 and 50 as using a known ball screw, known motor, and known guide rails. The unit body 31 further includes a supported portion 312 provided on the support table 311 and a rotating portion 313 connected to the supported portion 312 so as to be rotatable about a horizontal axis parallel to the X direction by a known motor. That is, the rotating portion 313 is a cylindrical portion having a rotation axis extending in the X direction.

The nut holder 32 and the blade chuck 34 are mounted on the rotating portion 313 at two positions spaced in the X direction. In the first preferred embodiment, the nut holder 32 is aligned with the blade chuck 34 as viewed in plan and is located on the standby area 92 side.

The nut holder 32 is a member for removing the fastening nut 26 of each cutting unit 20 from the mounting portion 241 of the blade mounting member 24, holding the fastening nut 26 removed, and mounting the fastening nut 26 held to the mounting portion 241 of the blade mounting member 24. The nut holder 32 is movable in a direction perpendicular to the X direction by an air cylinder (not depicted) mounted on the rotating portion 313.

As depicted in FIG. 9, the nut holder 32 includes a hollow cylindrical motor case 321 movable in the direction perpendicular to the X direction by the air cylinder mentioned above, an electric motor 322 having a drive shaft 322a provided in the motor case 321, a solid cylindrical rotating member 323 connected to the drive shaft 322a of the electric motor 322, an operating ring 324 provided so as to surround the cylindrical surface of the rotating member 323, and a second air cylinder 325 connecting the motor case 321 and the operating ring 324. The second air cylinder 325 is depicted in FIG. 9 only, and it is not depicted in the other drawings.

The drive shaft 322a of the electric motor 322 extends in the direction perpendicular to the X direction. By rotating the drive shaft 322a about its axis, the rotating member 323 is rotatable about its axis aligned with the axis of the drive shaft 322a. The rotating member 323 has an outer diameter stepwise changed. That is, the rotating member 323 is composed of a small-diameter portion 326 connected to the drive shaft 322a of the electric motor 322 and a large-diameter portion 327 coaxially connected to the small-diameter portion 326 in an integral manner. The large-diameter portion 327 is larger in outer diameter than the small-diameter portion 326. In the first preferred embodiment, the outer diameter of the small-diameter portion 326 is equal to the outer diameter of the motor case 321. In the first preferred embodiment, all of the drive shaft 322a, the motor case 321, and the rotating member 323 are coaxially arranged.

The operating ring 324 is a hollow cylindrical member having a bottom portion 328. The bottom portion 328 is located on the rotating portion 313 side, i.e., on the left side as viewed in FIG. 9. The operating ring 324 is arranged in coaxial relationship with the drive shaft 322a, the motor case 321, and the rotating member 323. The bottom portion 328 of the operating ring 324 has a central through hole 329 through which the small-diameter portion 326 of the rotating member 323 is inserted. The second air cylinder 325 has a piston rod 325a, which is connected to the operating ring 324. By expanding and contracting the piston rod 325a of the second air cylinder 325, the operating ring 324 is adapted to axially slide on the rotating member 323 between an inoperative position depicted by a solid line in FIG. 9 and an operative position depicted by a phantom line in FIG. 9. The operating ring 324 has an open front end opposite to the bottom portion 328. This open front end of the operating ring 324 is formed with four cutouts 331 for respectively receiving four holding members 330 to be hereinafter described.

Further, the nut holder 32 includes four pins 332 projecting from the end surface of the large-diameter portion 327 of the rotating member 323. The four pins 332 are arranged at equal intervals along the outer circumference of the rotating member 323. A circular flange portion 333 is formed at the base end (left end as viewed in FIG. 9) of each pin 332. The flange portion 333 of each pin 332 is slidably fitted in a cylinder hole 334 formed in an end portion of the large-diameter portion of the rotating member 323. A compression spring 335 is provided between the bottom surface of each cylinder hole 334 and the flange portion 333 of each pin 332. Each compression spring 335 normally biases the corresponding pin 332 in a direction of projecting the pin 332 from the end surface of the rotating member 323. Each cylinder hole 334 is provided with a stopper portion 336 adapted to engage with the flange portion 333 of each pin 332, thereby preventing the fall of each pin 332. The four pins 332 are adapted to respectively engage with the four pin engaging holes 261 of the fastening nut 26.

Further, the nut holder 32 includes four holding members 330 provided on the outer circumference of the rotating member 323. The four holding members 330 are arranged at equal intervals along the outer circumference of the rotating member 323. Each holding member 330 is an arm-shaped member extending substantially in the axial direction of the rotating member 323. Each holding member 330 has a front end projecting from the end surface of the large-diameter portion 327 of the rotating member 323, and a claw 337 is formed at this front end of each holding member 330. The claw 337 of each holding member 330 is adapted to engage with the annular groove 262 formed on the outer circumference of the fastening nut 26. Each holding member 330 is pivotably supported at its base end (left end as viewed in FIG. 9) to the outer circumferential surface of the small-diameter portion 326 of the rotating member 323. The four holding members 330 are adapted to be operated by the operating ring 324 and thereby pivotally moved about the base ends of the four holding members 330, so that the four claws 337 can be moved toward and away from each other. Further, a compression spring 338 is provided between the outer circumferential surface of the rotating member 323 and a central portion of each holding member 330. Each compression spring 338 normally biases the corresponding holding member 330 so that the corresponding claw 337 is normally biased radially outward, that is, the four claws 337 are normally biased so as to be moved away from each other.

In the inoperative position depicted by the solid line in FIG. 9, the claw 337 of each holding member 330 included in the nut holder 32 is kept at the most radially outward position by the corresponding compression spring 338, so that the engagement of each claw 337 with the annular groove 262 of the fastening nut 26 is canceled. When the piston rod 325a of the second air cylinder 325 is expanded to move the operating ring 324 to the operative position depicted by the phantom line in FIG. 9, the claw 337 of each holding member 330 is moved to the most radially inward position, so that each claw 337 is brought into engagement with the annular groove 262 of the fastening nut 26.

The blade chuck 34 is a member for holding the support base 212 of each cutting blade 21 under suction. The blade chuck 34 is movable in a direction perpendicular to the X direction by an air cylinder (not depicted) mounted on the rotating portion 313.

The blade chuck 34 includes a hollow cylindrical chuck body 341 movable in the direction perpendicular to the X direction by the above-mentioned air cylinder and a suction holding portion 342 mounted on the front end of the chuck body 341 for holding the support base 212 of each cutting blade 21 under suction. A vacuum produced by a vacuum source (not depicted) is applied to the suction holding portion 342 to thereby provide a suction force for holding the support base 212 of each cutting blade 21 under suction. The blade chuck 34 further includes a mounting hole 343 allowing the insertion of the mounting portion 241 of the blade mounting member 24 in changing each cutting blade 21. The mounting hole 343 is so formed as to have a depth ranging from the suction holding portion 342 to the chuck body 341.

The blade changing unit 3 is adapted to be moved by the moving unit for moving the support table 311 in the Z direction and by the moving unit for moving the support table 311 in the X direction, thereby taking a standby position defined behind the support frame 5 and a working position defined above the chuck table 10 set in the processing area 91. Further, in the working position, the rotating portion 313 is rotated about it axis to take a horizontal position where the nut holder 32 and the blade chuck 34 are opposed to the cutting blade 21 of each cutting unit 20 and a vertical position where the nut holder 32 and the blade chuck 34 are opposed to the chuck table 10.

The control unit 4 functions to control each component of the cutting apparatus 1 and thereby to perform the processing operation to the workpiece 200 under control. The control unit 4 is a computer including a processing unit (computing unit) having a microprocessor such as central processing unit (CPU), a storing unit having a memory such as read only memory (ROM) and random access memory (RAM), and an input/output interface unit. The processing unit in the control unit 4 functions to perform processing according to a computer program stored in the storing unit and output a control signal for controlling the cutting apparatus 1 through the input/output interface unit to each component of the cutting apparatus 1.

The control unit 4 is connected to a display unit (not depicted) such as a liquid crystal display for displaying the condition of the processing operation, the image of the workpiece 200, etc. The control unit 4 is also connected to an input unit (not depicted) adapted to be operated by an operator in recording the information on the processing of the workpiece 200. This input unit is configured by a touch panel provided in the display unit and/or an external input unit such as a keyboard.

(Transfer Jig)

Figure 10:
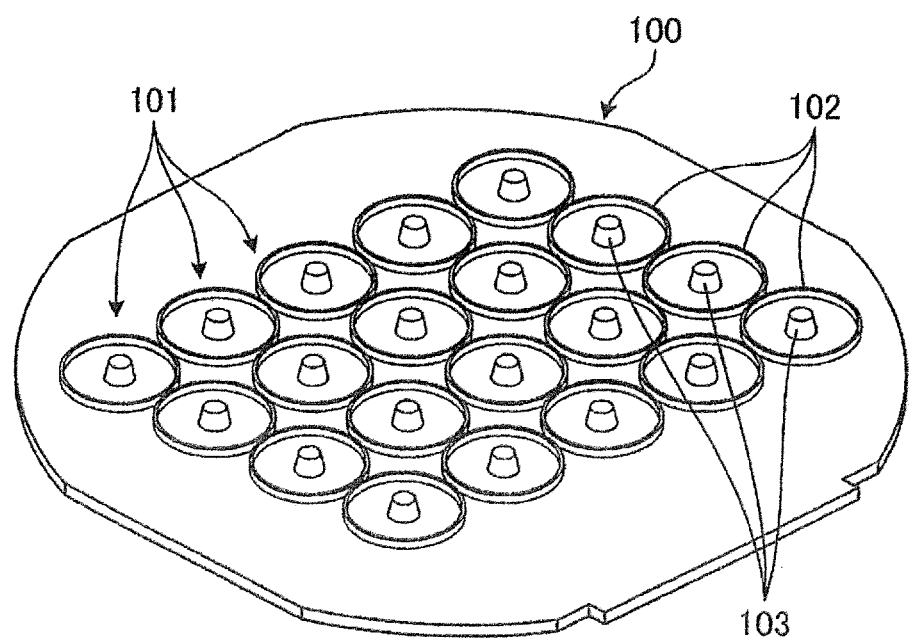
FIG. 10 is a perspective view depicting the configuration of a transfer jig according to the first preferred embodiment.
Figure 11:
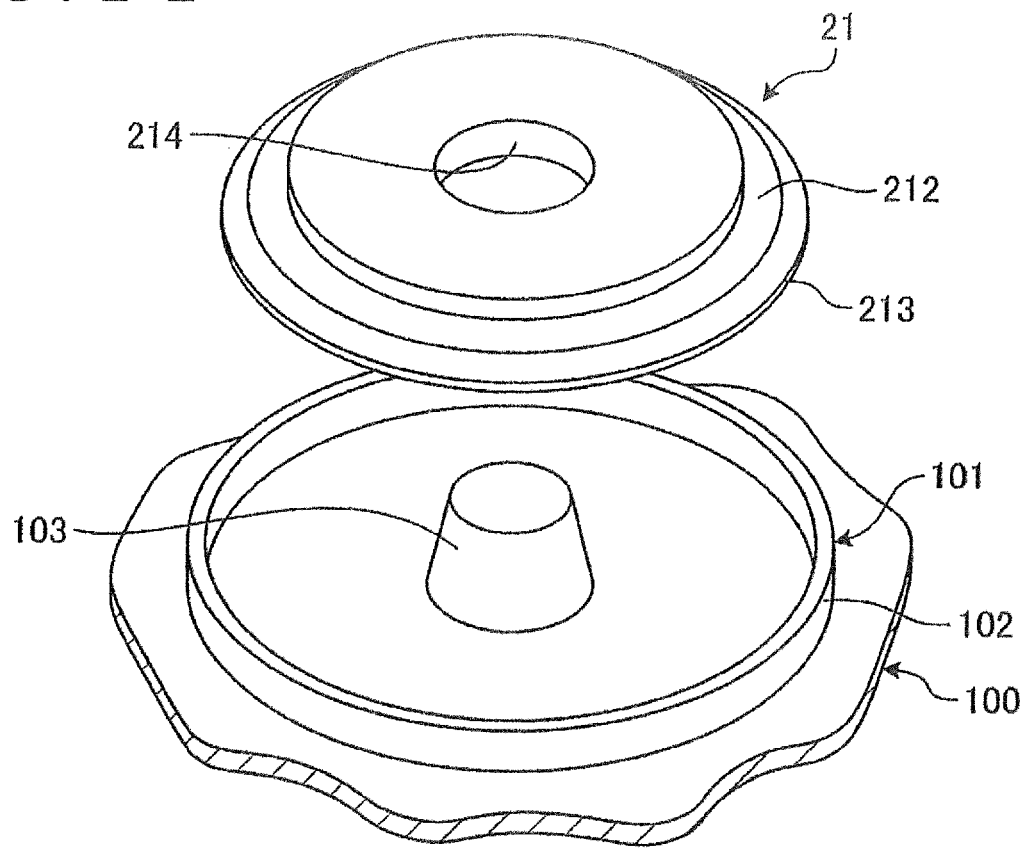
FIG. 11 is a perspective view depicting a receiving portion of the transfer jig depicted in FIG. 10.
Figure 12:
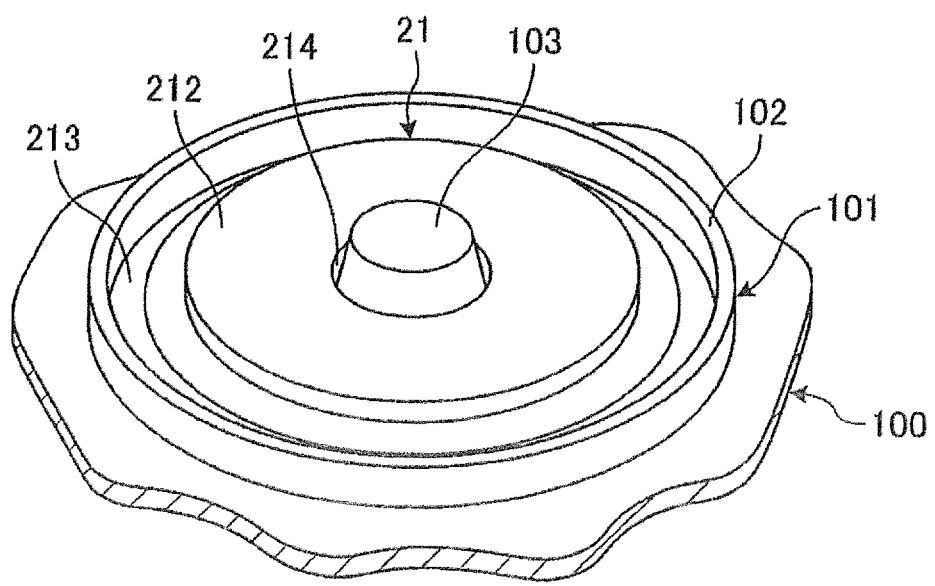
FIG. 12 is a perspective view depicting a condition where a cutting blade is received in the receiving portion depicted in FIG. 11.

The transfer jig according to the first preferred embodiment will now be described. FIG. 10 is a perspective view depicting the configuration of the transfer jig according to the first preferred embodiment. FIG. 11 is a perspective view depicting a receiving portion of the transfer jig depicted in FIG. 10. FIG. 12 is a perspective view depicting a condition where the cutting blade is received in the receiving portion depicted in FIG. 11.

Referring to FIG. 10, there is depicted a transfer jig 100 for use in the cutting apparatus 1. That is, the transfer jig 100 is a jig for use in transferring the cutting blade 21 to be used in performing the cutting operation to each cutting unit 20 of the processing unit 2. The transfer jig 100 is a plate-shaped member having the same outside shape as that of the annular frame 211 as viewed in plan. The transfer jig 100 is integrally formed of a hard material such as metal.

As depicted in FIGS. 10, 11, and 12, the transfer jig 100 has a plurality of receiving portions 101 for respectively receiving a plurality of cutting blades 21. That is, each receiving portion 101 is configured to receive one cutting blade 21 in position. Each receiving portion 101 has a cylindrical wall 102 projecting from the upper surface of the transfer jig 100 and a positioning projection 103 formed inside the cylindrical wall 102 so as to project from the upper surface of the transfer jig 100. The inner circumferential surface of the cylindrical wall 102 has the same shape as the outside shape of the cutting edge 213 of each cutting blade 21 as viewed in plan. The cylindrical wall 102 has a size capable of storing each cutting blade 21.

In the first preferred embodiment, each cutting blade 21 is stored inside the cylindrical wall 102 in the condition where the cutting edge 213 of each cutting blade 21 is spaced from the upper surface of the transfer jig 100. The positioning projection 103 is adapted to enter the mounting hole 214 of each cutting blade 21 stored inside the cylindrical wall 102, thereby positioning each cutting blade 21 inside the cylindrical wall 102. In the first preferred embodiment, the positioning projection 103 has a frustoconical shape such that the outer diameter of the positioning projection 103 is gradually decreased from the bottom connected to the upper surface of the transfer jig 100. In storing each cutting blade 21 inside the cylindrical wall 102, the inner circumference of the mounting hole 214 of each cutting blade 21 comes into contact with the outer circumference (conical surface) of the positioning projection 103 before the cutting edge 213 of each cutting blade 21 comes into contact with the upper surface of the transfer jig 100, so that each cutting blade 21 is fixed in position by the positioning projection 103. Accordingly, it is possible to prevent that the cutting edge 213 of each cutting blade 21 may come into direct contact with each receiving portion 101.

The transfer jig 100 can be stored into each slot 63 of the cassette 61 as similar to the annular frame 211 in the condition where each cutting blade 21 is received in each receiving portion 101. Further, the transfer jig 100 can be transferred by the transfer unit 80 as similar to the annular frame 211. That is, the transfer jig 100 is adapted to be transferred between the cassette 61 and the chuck table 10 by using the transfer unit 80 for common use in transferring the workpiece 200. Further, the transfer jig 100 is adapted to be positioned above the chuck table 10 by the plural transfer jig holding members 15 in such a manner that the outer circumference of the transfer jig 100 is in contact with the step portion 17 of each transfer jig holding member 15.

(Processing Operation of the Cutting Apparatus)

Figure 13:
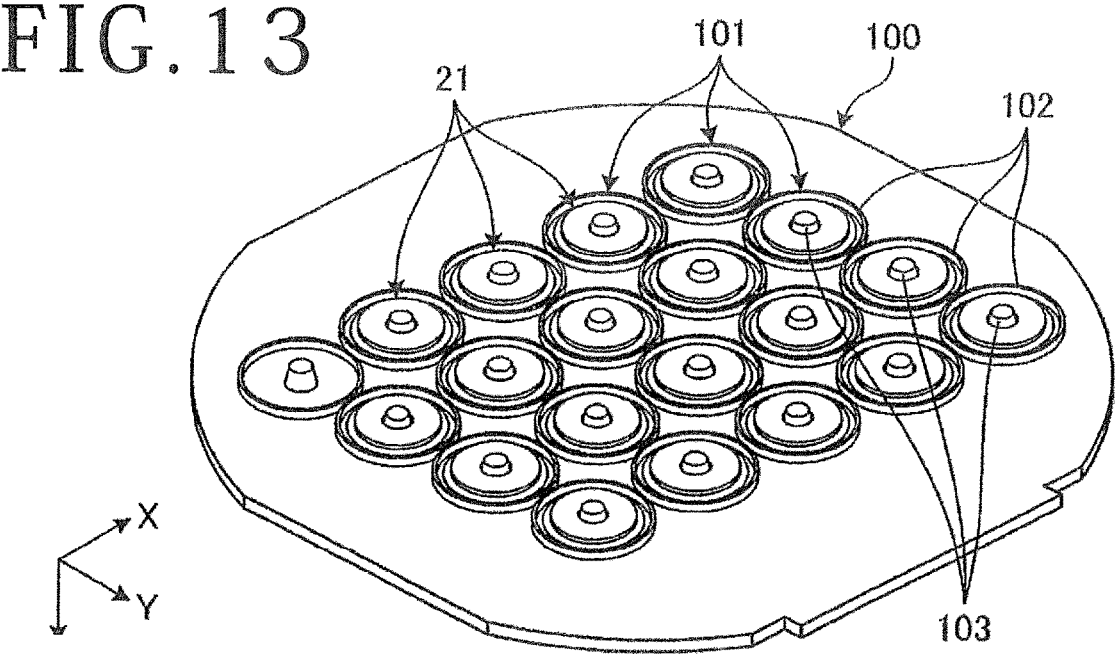
FIG. 13 is a perspective view depicting a condition where a plurality of cutting blades are received in a plurality of receiving portions of the transfer jig depicted in FIG. 10.
Figure 14:
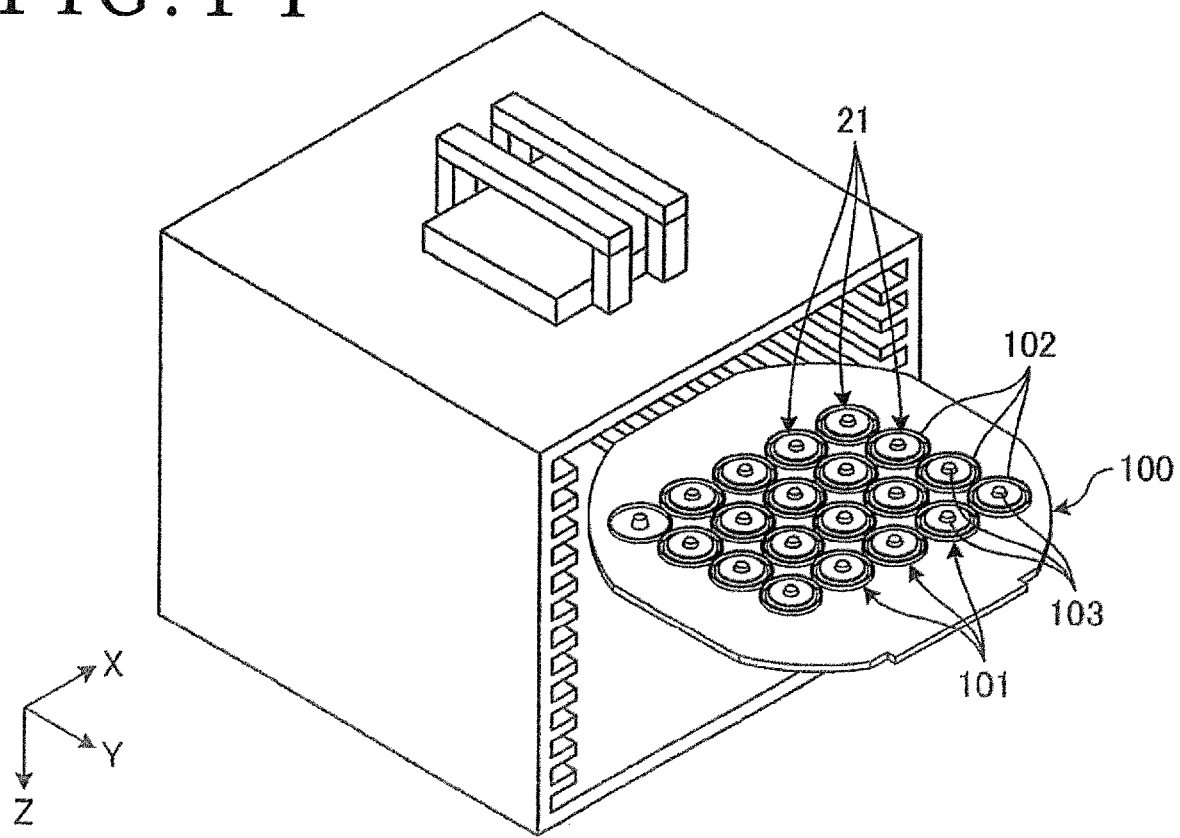
FIG. 14 is a perspective view depicting a manner of storing the transfer jig depicted in FIG. 13 into the cassette.

The processing operation of the cutting apparatus 1 will now be described. FIG. 13 is a perspective view depicting a condition where the plural cutting blades are received in the plural receiving portions of the transfer jig depicted in FIG. 10. FIG. 14 is a perspective view depicting a manner of storing the transfer jig depicted in FIG. 13 into the cassette.

In the processing operation, a plurality of cutting blades 21 are received into the plural receiving portions 101 of the transfer jig 100 as depicted in FIG. 13 by the operator, and the information on the processing of the workpiece 200 is recorded into the control unit 4 by the operator. Thereafter, as depicted in FIG. 14, the transfer jig 100 in the condition depicted in FIG. 13 is stored into the cassette 61. Further, a plurality of workpieces 200 to be processed are also stored into the cassette 61 by the operator. Thereafter, the cassette 61 is placed on the upper surface of the cassette elevator 60 by the operator.

In the first preferred embodiment, in receiving the plural cutting blades 21 into the plural receiving portions 101 of the transfer jig 100, the plural cutting blades 21 are received into the plural receiving portions 101 except one of all the receiving portions 101 included in the transfer jig 100. That is, no cutting blade 21 is received into one of all the receiving portions 101 of the transfer jig 100. Further, the information on the processing of the workpiece 200 to be recorded into the control unit 4 by the operator includes information indicating the position of the transfer jig 100 stored in the cassette 61. Further, the information on the processing of the workpiece 200 to be recorded into the control unit 4 by the operator also includes information indicating the positions of the plural receiving portions 101 of the transfer jig 100 in which the plural cutting blades 21 are received and information indicating the position of the receiving portion 101 in which no cutting blade 21 is received.

Thereafter, when starting of the processing operation is instructed by the operator, the processing operation is started by the cutting apparatus 1. When the processing operation is started, the control unit 4 operates the transfer unit 80 to transfer the workpiece 200 from the cassette 61 to the chuck table 10 set in the standby area 92. Thereafter, the control unit 4 operates the vacuum source connected to the chuck table 10 to hold the back side 204 of the workpiece 200 through the adhesive tape 210 on the holding surface 11 of the chuck table 10 under suction. Further, the control unit 4 operates the clamps 12 to clamp the annular frame 211.

Thereafter, the control unit 4 of the cutting apparatus 1 operates the X moving unit to move the chuck table 10 toward the processing area 91. During the movement of the chuck table 10, the control unit 4 operates the imaging unit 30 to image the workpiece 200 and then perform the alignment according to an image obtained by the imaging unit 30. In the processing area 91, the control unit 4 operates the X moving unit, each Y moving unit 40, and each Z moving unit 50 to relatively move the workpiece 200 and each cutting unit 20 along the division lines 202 as cutting the division lines 202 by using each cutting blade 21, thereby dividing the workpiece 200 into the individual devices 203. Thereafter, the control unit 4 operates the cleaning unit 70 to clean the workpiece 200 divided into the individual devices 203. Thereafter, the control unit 4 operates the transfer unit 80 to store the workpiece 200 into the cassette 61. When such a cutting operation is similarly performed to all the other workpieces 200 stored in the cassette 61, the processing operation of the cutting apparatus 1 is finished.

(Cutting Blade Changing Method)

Figure 15:
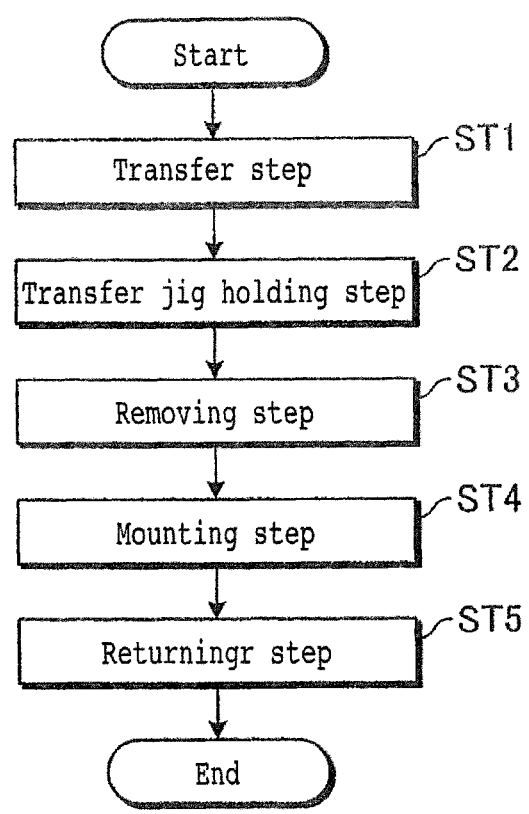
FIG. 15 is a flowchart depicting the cutting blade changing method according to the first preferred embodiment.

The cutting blade changing method according to the first preferred embodiment will now be described. FIG. 15 is a flowchart depicting the cutting blade changing method according to the first preferred embodiment. When the control unit 4 determines that the cutting blade 21 of at least one of the cutting units 20 has reached a blade change timing during the processing operation of the cutting apparatus 1 depicted in FIG. 1, the cutting blade changing method depicted by the flowchart in FIG. 15 is performed. The blade change timing means the timing of changing the cutting blade 21 of each cutting unit 20. For example, the blade change timing is the timing where a preset number of workpieces 200 have been cut by the cutting blade 21, and this timing is determined according to the kind of each cutting blade 21. This blade change timing is recorded as a part of the information on the processing of the workpiece 200 into the control unit 4. Alternatively, the blade change timing may be the timing at which one workpiece 200 is being processed or may be the timing of changing the workpiece 200 in continuously processing a plurality of workpieces 200.

The cutting blade changing method is a method of changing each cutting blade 21 by using the transfer jig 100 in the cutting apparatus 1 depicted in FIG. 1. As depicted in FIG. 15, the cutting blade changing method includes a transfer step ST1, a transfer jig holding step ST2, a removing step ST3, a mounting step ST4, and a returning step ST5.

(Transfer Step)

Figure 16:
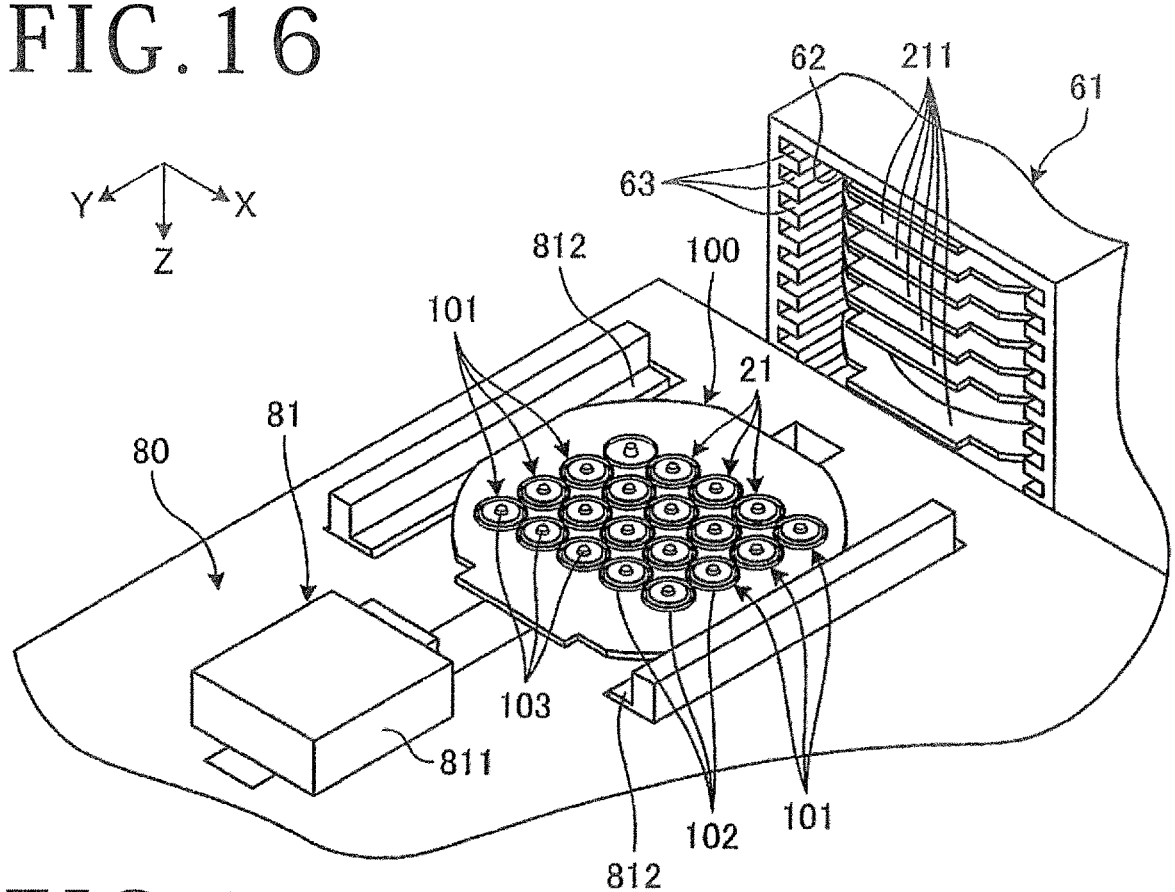
FIG. 16 is a perspective view depicting a condition where the transfer jig has been taken out of the cassette and then set on a pair of rails in a transfer step of the cutting blade changing method depicted in FIG. 15.
Figure 17:
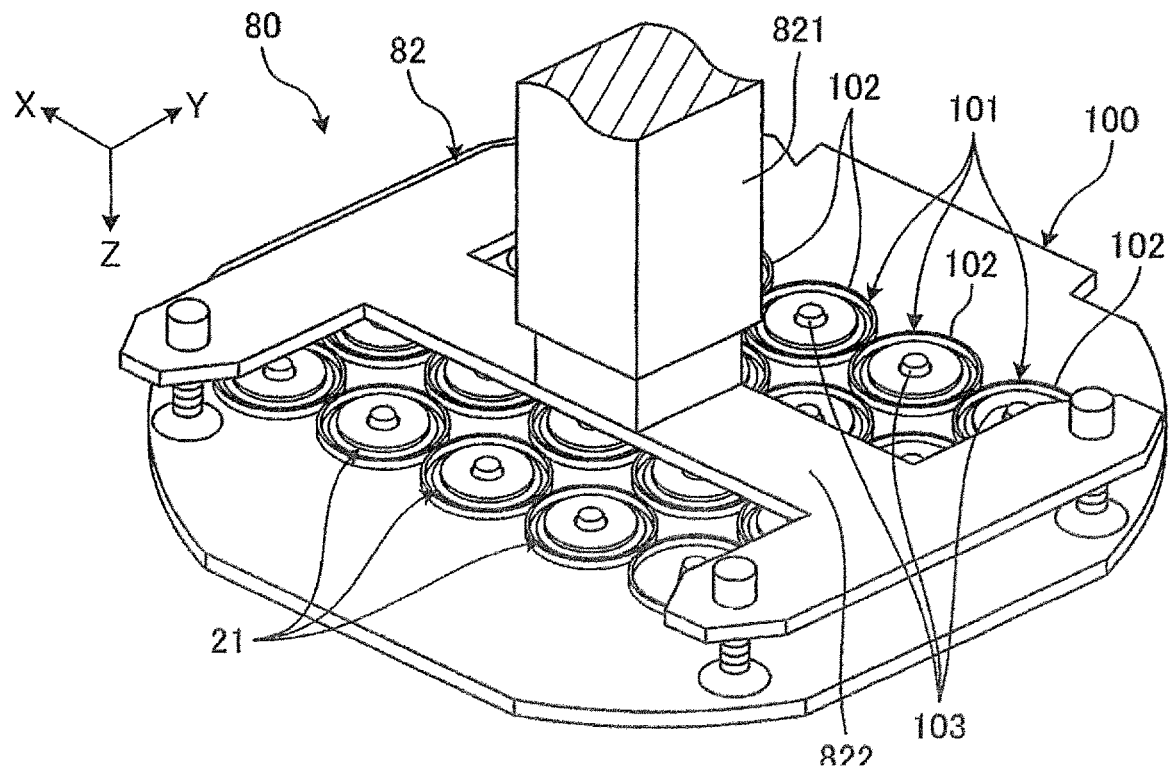
FIG. 17 is a perspective view depicting a condition where the transfer jig taken out of the cassette is held under suction by the transfer arm in the transfer step of the cutting blade changing method depicted in FIG. 15.

FIG. 16 is a perspective view depicting a condition where the transfer jig 100 has been taken out of the cassette 61 and then set on the rails 812 in the transfer step ST1 of the cutting blade changing method depicted in FIG. 15. FIG. 17 is a perspective view depicting a condition where the transfer jig 100 taken out of the cassette 61 is held under suction by the transfer arm 82 in the transfer step ST1 of the cutting blade changing method depicted in FIG. 15.

The transfer step ST1 is the step of transferring the transfer jig 100 to the chuck table 10 of the processing unit 2 by operating the transfer unit 80, in which a plurality of cutting blades 21 as replacement parts are previously set in the receiving portions 101 of the transfer jig 100 in the condition where one of all the receiving portions 101 is left as an empty receiving portion. In the transfer step ST1, the control unit 4 operates the cassette elevator 60 to make the level of the slot 63 supporting the transfer jig 100 in the cassette 61 equal to the level of the rails 812 of the temporary setting unit 81. Thereafter, the control unit 4 operates the handling unit 811 to take the transfer jig 100 out of the cassette 61 and next set the transfer jig 100 on the rails 812 as depicted in FIG. 16.

In the transfer step ST1, the control unit 4 next operates one of the two transfer arms 82 to hold under suction the transfer jig 100 set on the rails 812 as depicted in FIG. 17 and next operates the transfer arm 82 to transfer the transfer jig 100 to the chuck table 10. Thereafter, the program proceeds to the transfer jig holding step ST2.

(Transfer Jig Holding Step)

Figure 18:
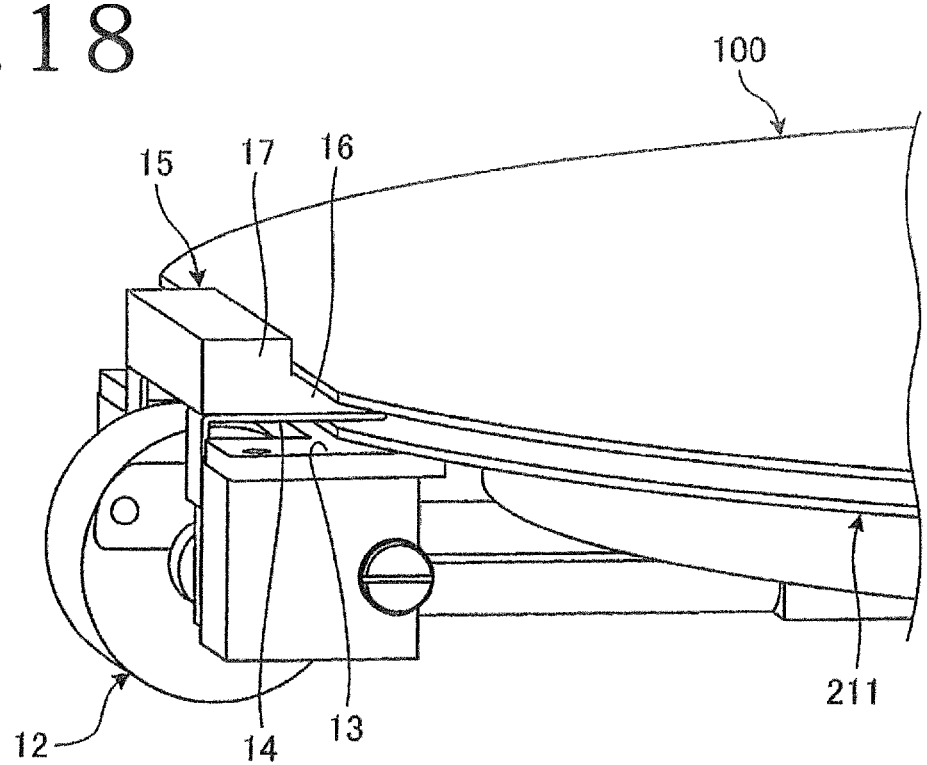
FIG. 18 is a perspective view depicting a condition where the transfer jig is held in position above the chuck table by a plurality of transfer jig holding members in a transfer jig holding step of the cutting blade changing method depicted in FIG. 15.

FIG. 18 is a perspective view depicting a condition where the transfer jig 100 is held in position by the plural transfer jig holding members 15 in the transfer jig holding step ST2 of the cutting blade changing method depicted in FIG. 15. The transfer jig holding step ST2 is the step of holding the transfer jig 100 above the chuck table 10 by using the plural transfer jig holding members 15.

In the transfer jig holding step ST2, the control unit 4 operates the X moving unit to move the chuck table 10 to the standby area 92 and then operates the transfer arm 82 holding the transfer jig 100 to position the transfer jig 100 above the plural transfer jig holding members 15 in such a manner that the outer circumference of the transfer jig 100 is positioned above the inner surfaces of the step portions 17 of the plural transfer jig holding members 15. Thereafter, the control unit 4 operates the transfer arm 82 to bring the outer circumference of the transfer jig 100 into abutment against the inner surfaces of the step portions 17 of the plural transfer jig holding members 15. At this time, the lower surface of the transfer jig 100 in its peripheral portion is placed on the flat portion 16 of each transfer jig holding member 15 as depicted in FIG. 18. Thereafter, the suction holding of the transfer jig 100 by the transfer arm 82 is canceled, and the transfer arm 82 is retracted from the chuck table 10. Thereafter, the program proceeds to the removing step ST3. In FIG. 18, the receiving portions 101 and the cutting blades 21 of the transfer jig 100 are not depicted.

(Removing Step)

Figure 19:
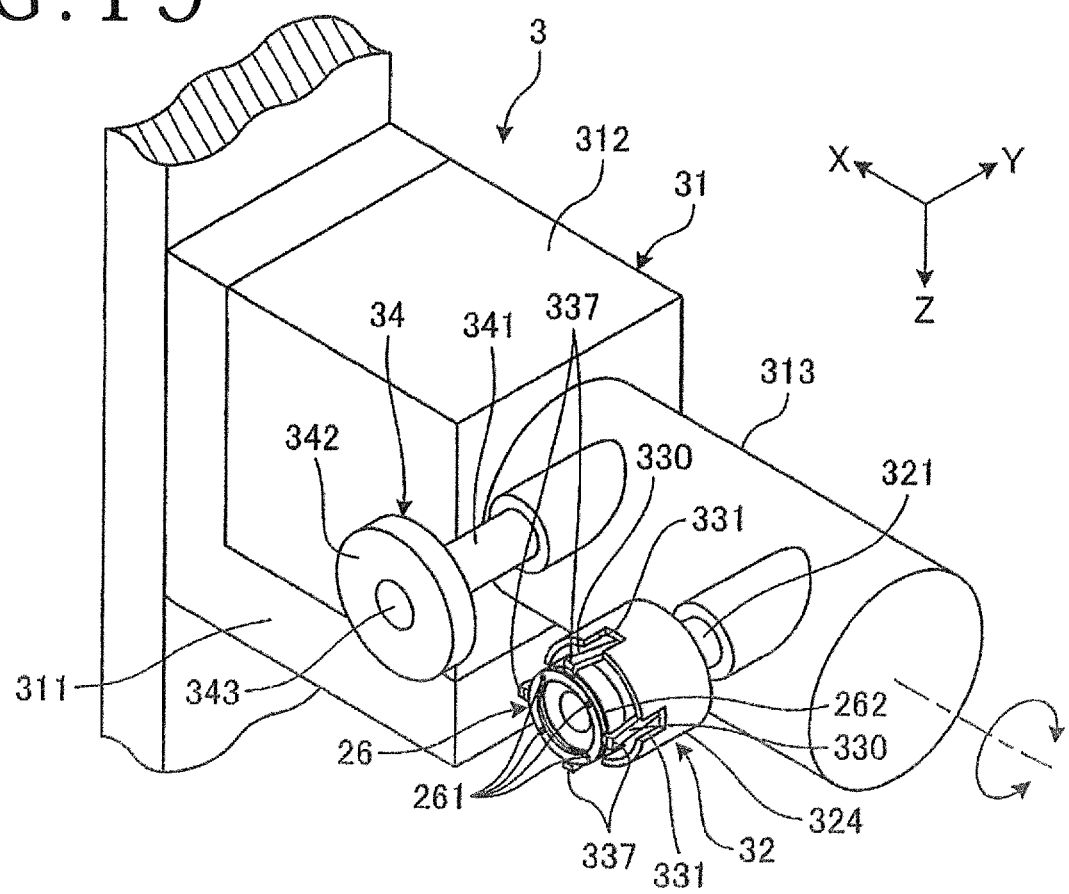
FIG. 19 is a perspective view depicting a condition where a fastening nut has been removed in a removing step of the cutting blade changing method depicted in FIG. 15.
Figure 20:
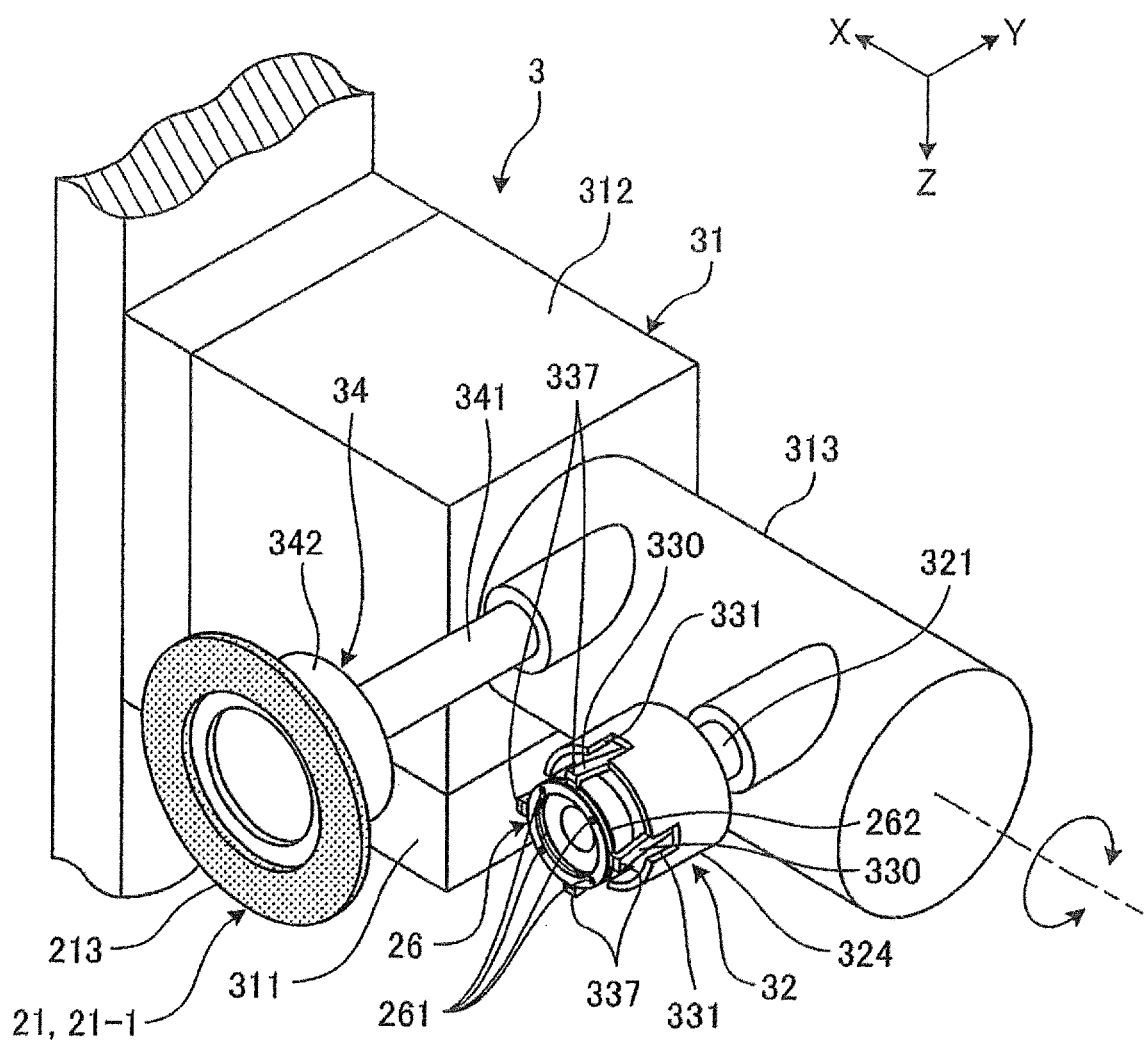
FIG. 20 is a perspective view depicting a condition where the cutting blade to be replaced by a new one has been removed in the removing step.
Figure 21:
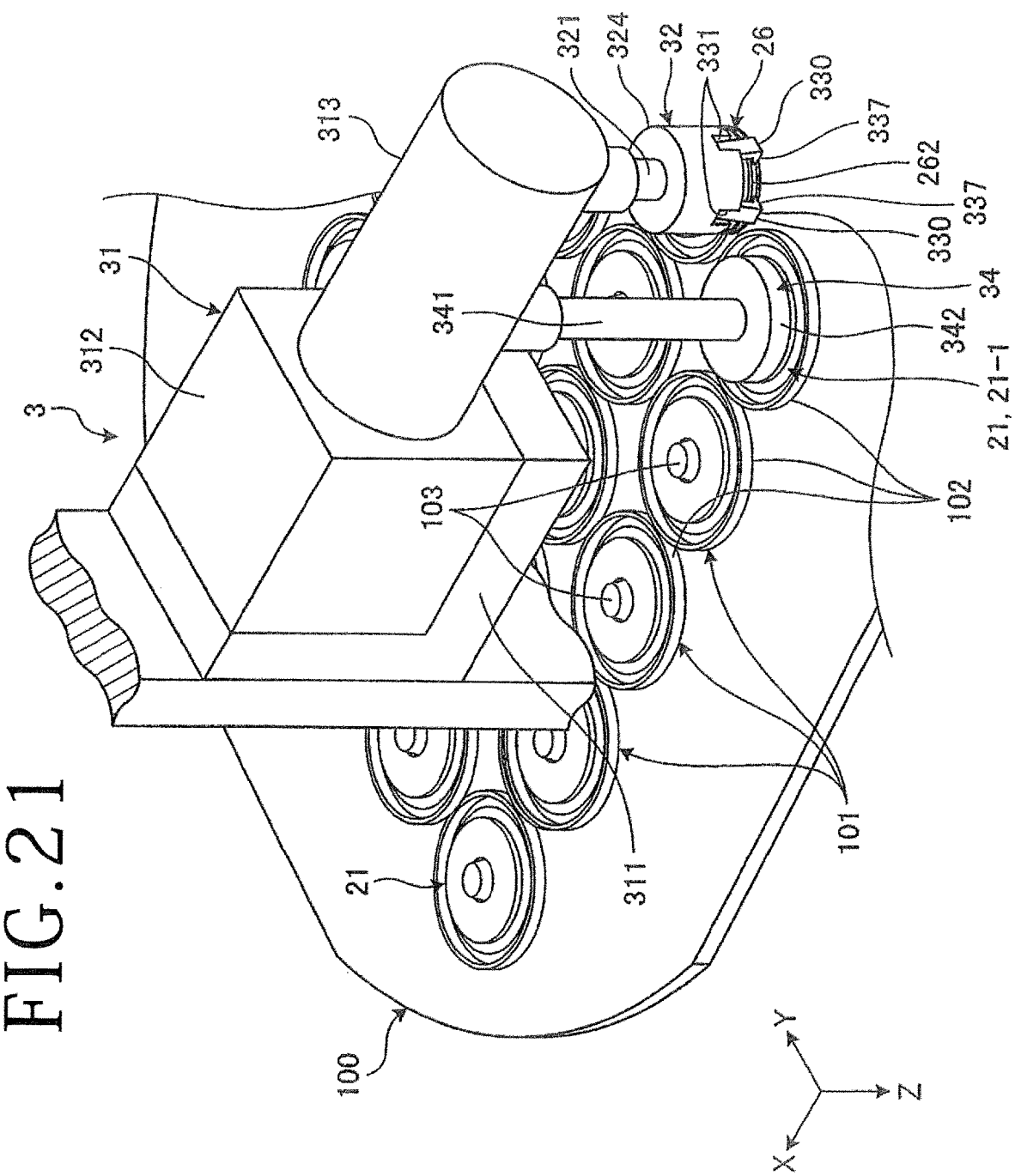
FIG. 21 is a perspective view depicting a condition where the cutting blade removed has been received by an empty one of all the receiving portions of the transfer jig in the removing step.

FIG. 19 is a perspective view depicting a condition where the fastening nut 26 has been removed in the removing step ST3 of the cutting blade changing method depicted in FIG. 15. FIG. 20 is a perspective view depicting a condition where the cutting blade 21 to be replaced by a new one has been removed in the removing step ST3 of the cutting blade changing method depicted in FIG. 15. FIG. 21 is a perspective view depicting a condition where the cutting blade 21 removed has been received by the empty receiving portion 101 of the transfer jig 100 in the removing step ST3 of the cutting blade changing method depicted in FIG. 15.

The removing step ST3 is the step of removing the old cutting blade 21 (which will be hereinafter denoted by reference numeral 21-1) to be replaced by a new one from the spindle 23 by using the blade changing unit 3. In the removing step ST3, the control unit 4 operates the moving unit and the rotating portion 313 of the blade changing unit 3 to make the nut holder 32 be opposed to the fastening nut 26 in the Y direction, in which the old cutting blade 21-1 is fixed to the blade mounting member 24 by the fastening nut 26. Thereafter, the control unit 4 operates the second air cylinder 325 to contract the piston rod 325a, thereby setting the operating ring 324 in the inoperative position depicted by the solid line in FIG. 9. Thereafter, the control unit 4 operates the air cylinder for the nut holder 32 to expand the piston rod, thereby bringing the end surface of the rotating member 323 into abutment against the fastening nut 26.

Thereafter, the control unit 4 operates the second air cylinder 325 to expand the piston rod 325a, thereby setting the operating ring 324 in the operative position depicted by the phantom line in FIG. 9. Accordingly, the claw 337 of each holding member 330 comes into engagement with the annular groove 262 of the fastening nut 26. Thereafter, the control unit 4 operates the electric motor 322 to rotate the rotating member 323 in a direction where the fastening nut 26 is disengaged from the external thread 243. Accordingly, the pins 332 come into engagement with the pin engaging holes 261, respectively. As a result, the fastening nut 26 is rotated together with the rotating member 323 in the nut disengaging direction.

The electric motor 322 is operated to rotate the rotating member 323 for a predetermined period of time. Accordingly, the fastening nut 26 is disengaged from the external thread 243 formed on the mounting portion 241 of the blade mounting member 24. Thereafter, in the condition where the operative position of the operating ring 324 depicted by the phantom line in FIG. 9 is maintained, the control unit 4 operates the air cylinder for the nut holder 32 to contract the piston rod as depicted in FIG. 19.

When the moving unit and the rotating portion 313 of the blade changing unit 3 is operated by the control unit 4, the blade chuck 34 is also made to be opposed to the support base 212 of the old cutting blade 21-1 in the Y direction. In this condition, the control unit 4 operates the air cylinder for the blade chuck 34 to expand the piston rod. Accordingly, the suction holding portion 342 of the blade chuck 34 comes into abutment against the support base 212 of the old cutting blade 21-1 as depicted in FIG. 20, so that the support base 212 of the old cutting blade 21-1 is held under suction by the suction holding portion 342. Thereafter, in the condition where the support base 212 of the old cutting blade 21-1 is held under suction by the suction holding portion 342, the control unit 4 operates the air cylinder for the blade chuck 34 to contract the piston rod.

Thereafter, the control unit 4 operates the moving unit and the rotating portion 313 of the blade changing unit 3 and the X moving unit to make the blade chuck 34 be opposed to the empty receiving portion 101 of the transfer jig 100 positioned above the chuck table 10 in the Z direction, in which no cutting blade 21 is present in the empty receiving portion 101. Thereafter, the control unit 4 operates the air cylinder for the blade chuck 34 to expand the piston rod, thereby storing the old cutting blade 21-1 held by the suction holding portion 342 into the empty receiving portion 101 of the transfer jig 100 as depicted in FIG. 21. Thereafter, the suction holding of the old cutting blade 21-1 by the suction holding portion 342 is canceled. Then, the program proceeds to the mounting step ST4.

(Mounting Step)

Figure 22:
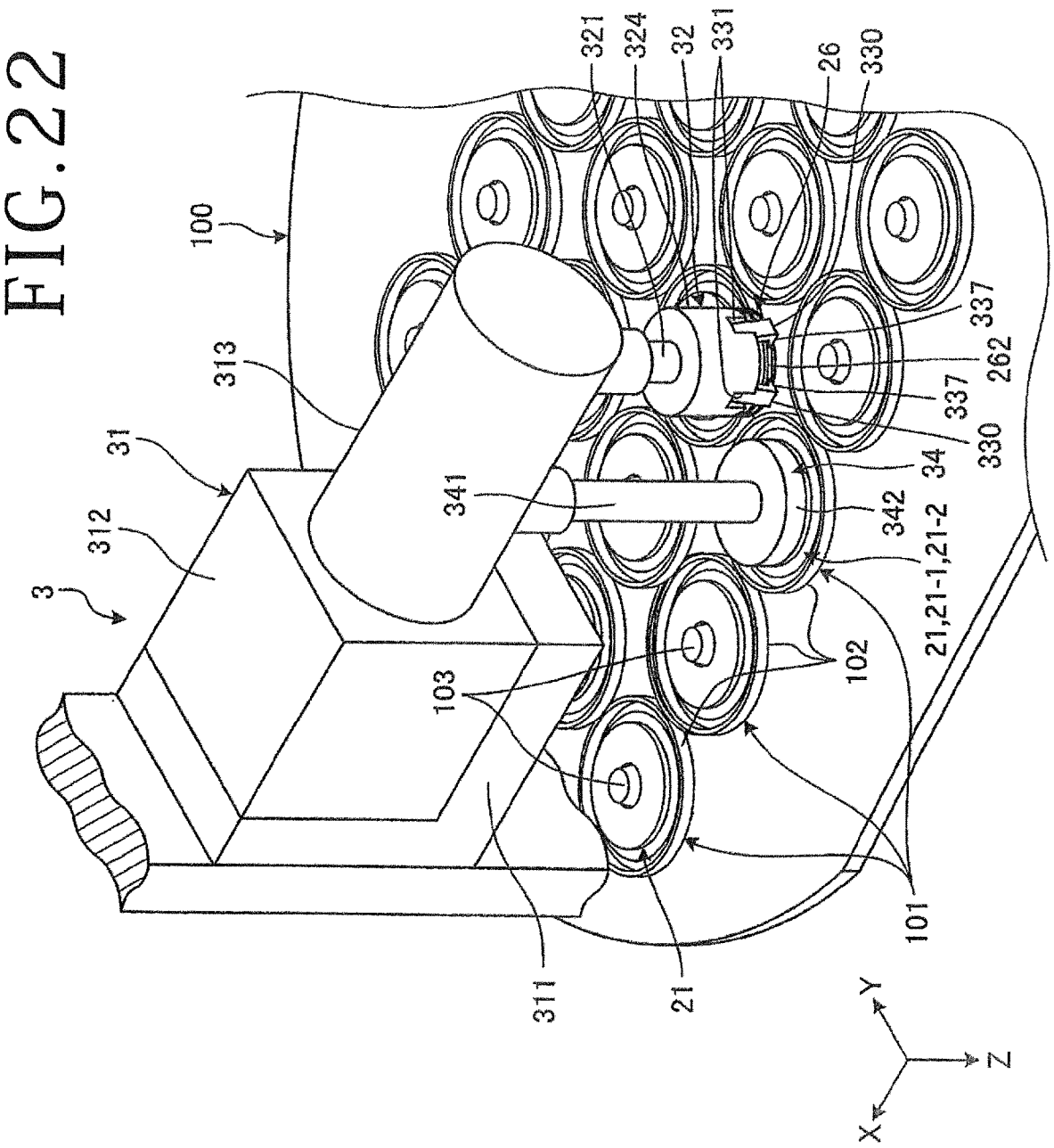
FIG. 22 is a perspective view depicting a condition where a new cutting blade has been held under suction by a blade chuck in a mounting step of the cutting blade changing method depicted in FIG. 15.
Figure 23:
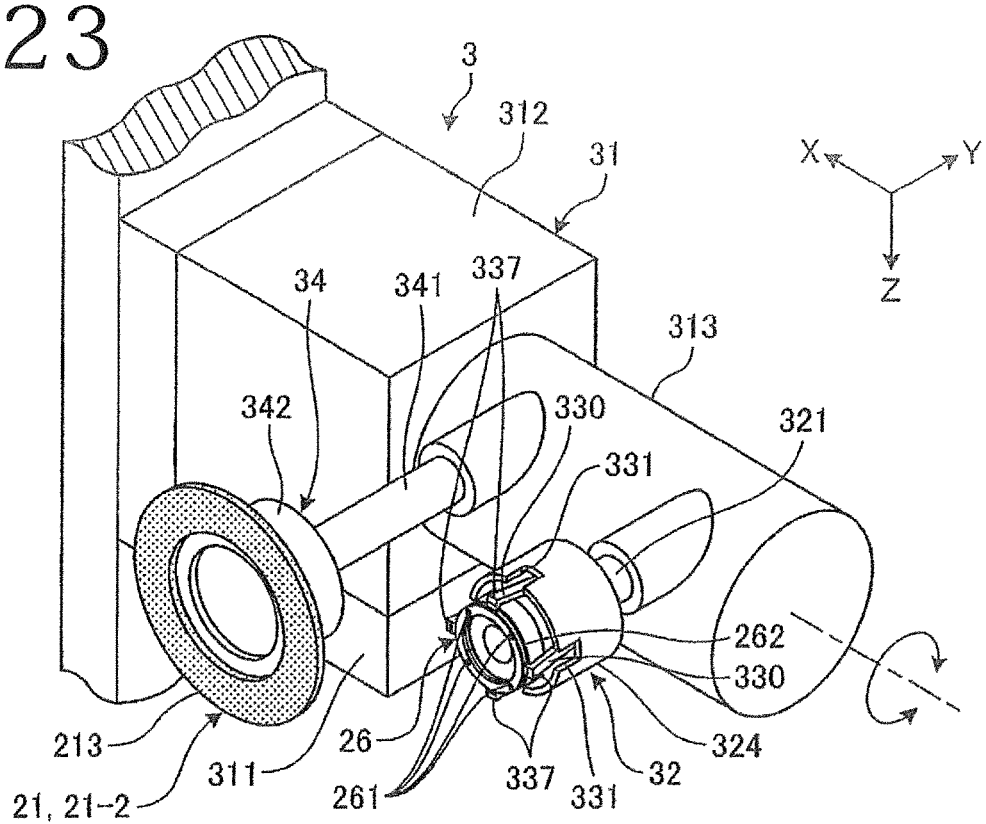
FIG. 23 is a perspective view depicting a condition where the new cutting blade held by the blade chuck is about to be mounted on a blade mounting member of the cutting unit in the mounting step.
Figure 24:
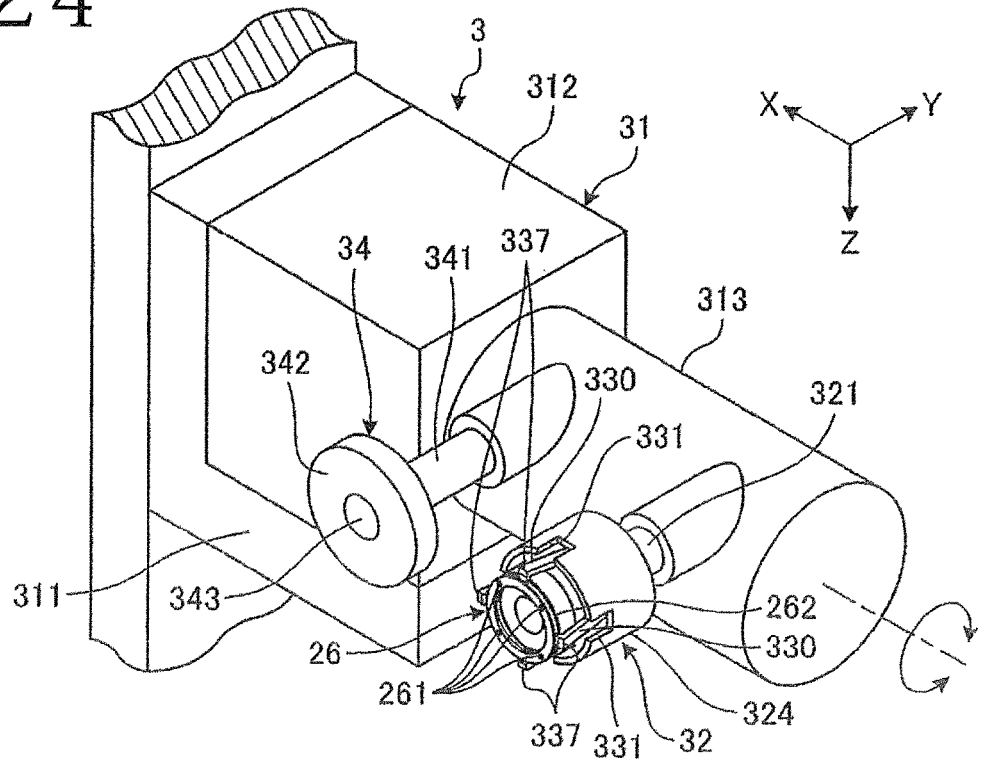
FIG. 24 is a perspective view depicting a condition where the fastening nut held by the nut holder is about to be mounted on the blade mounting member in the mounting step.

FIG. 22 is a perspective view depicting a condition where a new cutting blade 21 has been held under suction by the blade chuck 34 in the mounting step ST4 of the cutting blade changing method depicted in FIG. 15. FIG. 23 is a perspective view depicting a condition where the new cutting blade 21 held by the blade chuck 34 is about to be mounted on the blade mounting member 24 in the mounting step ST4 of the cutting blade changing method depicted in FIG. 15. FIG. 24 is a perspective view depicting a condition where the fastening nut 26 held by the nut holder 32 is about to be mounted on the blade mounting member 24 in the mounting step ST4 of the cutting blade changing method depicted in FIG. 15.

The mounting step ST4 is the step of mounting the new cutting blade 21 (which will be hereinafter denoted by reference numeral 21-2) as a replacement part set on the transfer jig 100 to the spindle 23 by using the blade changing unit 3. In the mounting step ST4, the control unit 4 operates the moving unit of the blade changing unit 3 and the X moving unit to make the blade chuck 34 be opposed to any one of the plural receiving portions 101 of the transfer jig 100 placed above the chuck table 10 in the Z direction, in which the plural new cutting blades 21-2 are previously stored in the plural receiving portions 101. Thereafter, the control unit 4 operates the air cylinder for the blade chuck 34 to expand the piston rod, thereby bringing the support base 212 of the new cutting blade 21-2 into abutment against the suction holding portion 342 as depicted in FIG. 22, so that the support base 212 of the new cutting blade 21-2 is held under suction by the suction holding portion 342.

Thereafter, the control unit 4 operates the air cylinder for the blade chuck 34 to contract the piston rod and then operates the moving unit and the rotating portion 313 of the blade changing unit 3 to make the blade chuck 34 be opposed to the blade mounting member 24 in the X direction, in which the old cutting blade 21-1 has already been removed from the blade mounting member 24. Thereafter, the control unit 4 operates the air cylinder for the blade chuck 34 to expand the piston rod as depicted in FIG. 23, thereby engaging the mounting hole 214 of the support base 212 of the new cutting blade 21-2 held by the blade chuck 34 with the mounting portion 241 of the blade mounting member 24. Thus, the new cutting blade 21-2 is mounted on the blade mounting member 24. Thereafter, the suction holding of the new cutting blade 21-2 by the blade chuck 34 is canceled, and the piston rod of the air cylinder for the blade chuck 34 is contracted as depicted in FIG. 24.

Thereafter, the control unit 4 operates the moving unit of the blade changing unit 3 to make the nut holder 32 be opposed to the blade mounting member 24 in the Y direction, in which the new cutting blade 21-2 has already been mounted on the blade mounting member 24. Thereafter, the control unit 4 operates the air cylinder for the nut holder 32 to expand the piston rod and then operates the electric motor 322 to rotate the rotating member 323 in a direction where the fastening nut 26 is engaged with the external thread 243. The electric motor 322 is operated to rotate the rotating member 323 for a predetermined period of time in the nut engaging direction. As a result, the fastening nut 26 is engaged with the external thread 243 formed on the mounting portion 241 of the blade mounting member 24.

Thereafter, the control unit 4 operates the second air cylinder 325 to move the operating ring 324 to the inoperative position depicted by the solid line in FIG. 9. As a result, the claw 337 of each holding member 330 is disengaged from the annular groove 262 of the fastening nut 26. In the condition where the operating ring 324 is kept in the inoperative position depicted by the solid line in FIG. 9, the control unit 4 operates the air cylinder for the nut holder 32 to contract the piston rod and then operates the rotating portion 313 to make the nut holder 32 and the blade chuck 34 be directed downward. Thereafter, the control unit 4 operates the moving unit to move the blade changing unit 3 to the standby position defined behind the support frame 5. Then, the program proceeds to the returning step ST5.

(Returning Step)

Figure 25:
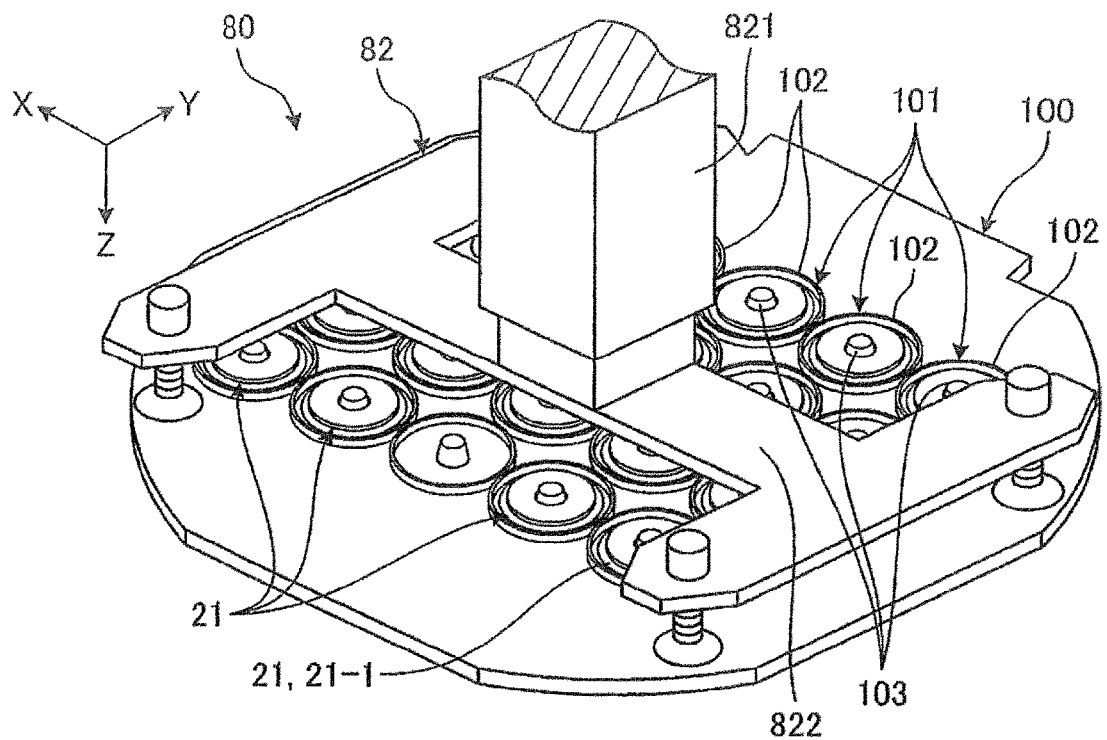
FIG. 25 is a perspective view depicting a condition where the transfer jig positioned above the chuck table is held under suction by the transfer arm in a returning step of the cutting blade changing method depicted in FIG. 15.
Figure 26:
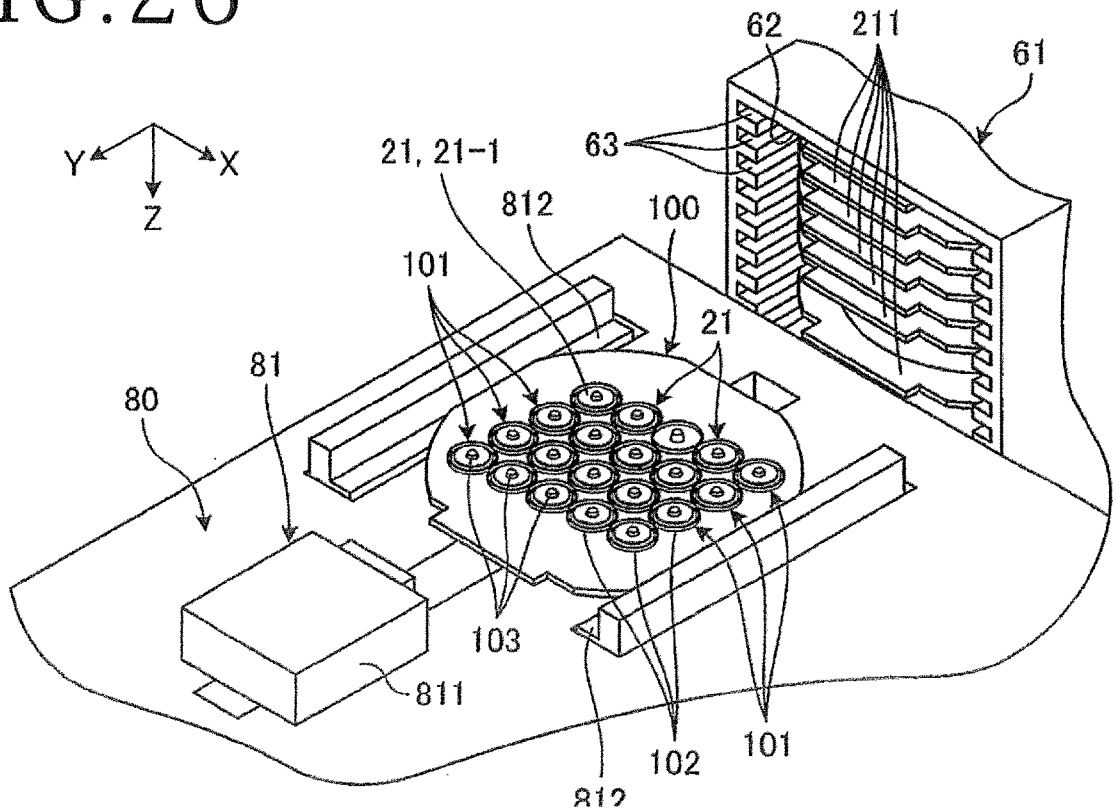
FIG. 26 is a perspective view depicting a condition where the transfer jig set on the rails is about to be stored into the cassette in the returning step.

FIG. 25 is a perspective view depicting a condition where the transfer jig 100 positioned above the chuck table 10 is held under suction by the transfer arm 82 in the returning step ST5 of the cutting blade changing method depicted in FIG. 15. FIG. 26 is a perspective view depicting a condition where the transfer jig 100 set on the rails 812 is about to be stored into the cassette 61 in the returning step ST5 of the cutting blade changing method depicted in FIG. 15.

The returning step ST5 is the step of returning the transfer jig 100 carrying the old cutting blade 21-1 to the cassette 61 by using the transfer unit 80, in which the old cutting blade 21-1 removed from the spindle 23 is present in the receiving portion 101 of the transfer jig 100. In the returning step ST5, the control unit 4 operates the X moving unit to move the chuck table 10 to the standby area 92 and then operates the transfer arm 82 to hold under suction the transfer jig 100 positioned above the chuck table 10 as depicted in FIG. 25. Thereafter, the control unit 4 operates the transfer arm 82 to set the transfer jig 100 on the rails 812 and then cancels the suction holding of the transfer jig 100 by the transfer arm 82 as depicted in FIG. 26. Thereafter, the control unit 4 operates the handling unit 811 of the temporary setting unit 81 to transfer the transfer jig 100 from the rails 812 into the original slot 63 of the cassette 61. In this manner, the cutting blade changing method is finished.

In the cutting blade changing method and the transfer jig 100 according to the first preferred embodiment mentioned above, the transfer jig 100 having the new cutting blade 21-2 is transferred to the position above the chuck table 10 of the processing unit 2 by the transfer unit 80. In this condition, the old cutting blade 21-1 to be replaced by the new cutting blade 21-2 is removed from the cutting unit 20 by the blade changing unit 3, and the new cutting blade 21-2 is mounted to the cutting unit 20. Further, the outside shape of the transfer jig 100 is the same as the outside shape of the annular frame 211 as viewed in plan. Accordingly, in the cutting blade changing method using the transfer jig 100, the cutting blade 21 (new cutting blade 21-2) can be automatically supplied to the processing unit 2 by utilizing the transfer unit 80 for use in transferring the workpiece 200 without adding any special transfer mechanism. As a result, in the cutting blade changing method using the transfer jig 100, the number of steps required for replacement of the cutting blade 21 can be reduced.

Further, in the cutting blade changing method according to the first preferred embodiment, each clamp 12 of the chuck table 10 is provided with the transfer jig holding member 15. Accordingly, even when the workpiece 200 is held on the chuck table 10 under suction, the transfer jig 100 can be held above the chuck table 10 (above the workpiece 200) by each transfer jig holding member 15. As a result, even when the workpiece 200 is held on the chuck table 10 in the cutting operation, the cutting blade 21 can be changed in the condition where the transfer jig 100 is held above the chuck table 10.

Further, in the cutting blade changing method according to the first preferred embodiment, the transfer jig 100 can be stored in the cassette 61, so that the space for storing the transfer jig 100 can be minimized. Further, since the transfer jig 100 can be stored in the cassette 61, the new cutting blade 21-2 can be automatically supplied by installing the blade changing unit 3 in the existing apparatus.

<Modification>

Figure 27:
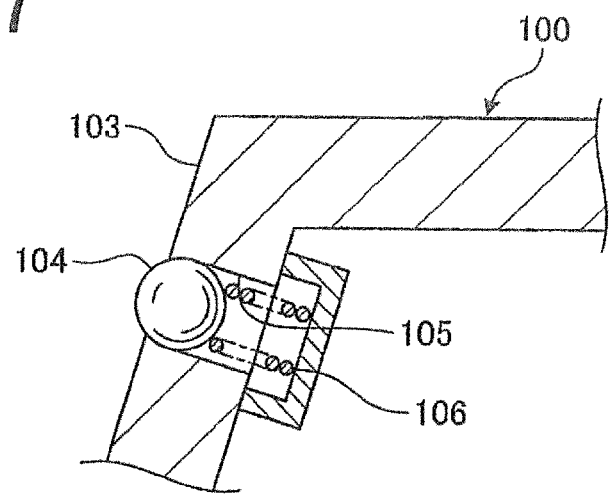
FIG. 27 is an enlarged sectional view of an essential part of a transfer jig according to a modification of the first preferred embodiment.

A cutting blade changing method and a transfer jig according to a modification of the first preferred embodiment will now be described with reference to the drawings. FIG. 27 is an enlarged sectional view of an essential part of the transfer jig according to the modification of the first preferred embodiment. In FIG. 27, substantially the same parts as those in the first preferred embodiment are denoted by the same reference numerals, and the description thereof will be omitted.

The transfer jig 100 according to the modification of the first preferred embodiment depicted in FIG. 27 has a plurality of receiving portions 101 similar to those depicted in FIG. 10, and each receiving portion 101 has a positioning projection 103 provided with a plurality of ball plungers 104. Each ball plunger 104 is adapted to engage with the inner circumference of the support base 212 of each cutting blade 21. The plural ball plungers 104 are arranged at equal intervals in the circumferential direction of the positioning projection 103. The positioning projection 103 is formed with a plurality of through holes 105 respectively corresponding to the plural ball plungers 104. That is, each ball plunger 104 is inserted in the corresponding through hole 105. Each ball plunger 104 inserted in the corresponding through hole 105 is normally biased by a compression spring 106 in a direction where each ball plunger 104 partially projects from the outer circumferential surface of the positioning projection 103. The diameter of each through hole 105 at its outer end exposed to the outer circumferential surface of the positioning projection 103 is set smaller than the diameter of each ball plunger 104, thereby preventing the fall of each ball plunger 104.

As described above, each ball plunger 104 partially projects from the outer circumferential surface of the positioning projection 103, so that each ball plunger 104 comes into engagement with the inner circumference of the support base 212 of each cutting blade 21, and the support base 212 of each cutting blade 21 is finally held in position between the upper surface of the transfer jig 100 and each ball plunger 104. Further, when the mounting hole 343 of the suction holding portion 342 of the blade chuck 34 of the blade changing unit 3 is engaged with the positioning projection 103, each ball plunger 104 is depressed by the inner surface of the mounting hole 343 against the biasing force of the compression spring 106, so that the engagement of each ball plunger 104 with the inner circumference of the support base 212 of each cutting blade 21 can be canceled. Accordingly, the support base 212 of each cutting blade 21 can be held under suction by the suction holding portion 342.

The cutting blade changing method and the transfer jig 100 according to the present modification can exhibit an effect similar to that of the first preferred embodiment. That is, the cutting blade 21 can be automatically supplied to the processing unit 2 by utilizing the transfer unit 80 for use in transferring the workpiece 200 without adding any special transfer mechanism. As a result, the number of steps required for replacement of the cutting blade 21 can be reduced.

Further, in the cutting blade changing method and the transfer jig 100 according to the present modification, the positioning projection 103 of each receiving portion 101 has the plural ball plungers 104 adapted to engage with the inner circumference of the support base 212 of each cutting blade 21. Accordingly, during the transfer of the transfer jig 100, possible displacement of each cutting blade 21 from the positioning projection 103 of each receiving portion 101 of the transfer jig 100 can be suppressed.

Second Preferred Embodiment

Figure 28:
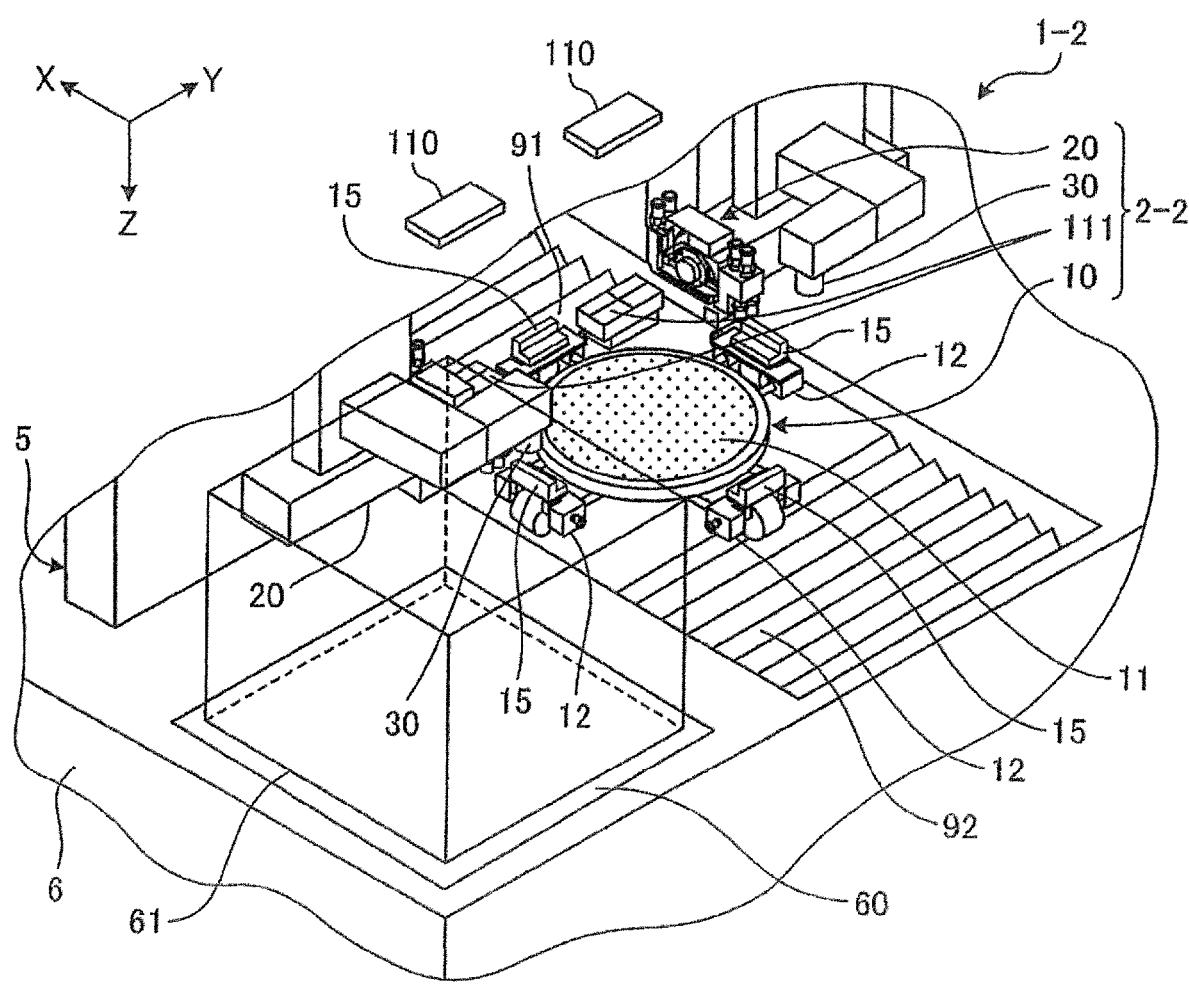
FIG. 28 is a perspective view of an essential part of a cutting apparatus for performing a cutting blade changing method according to a second preferred embodiment of the present invention.
Figure 29:
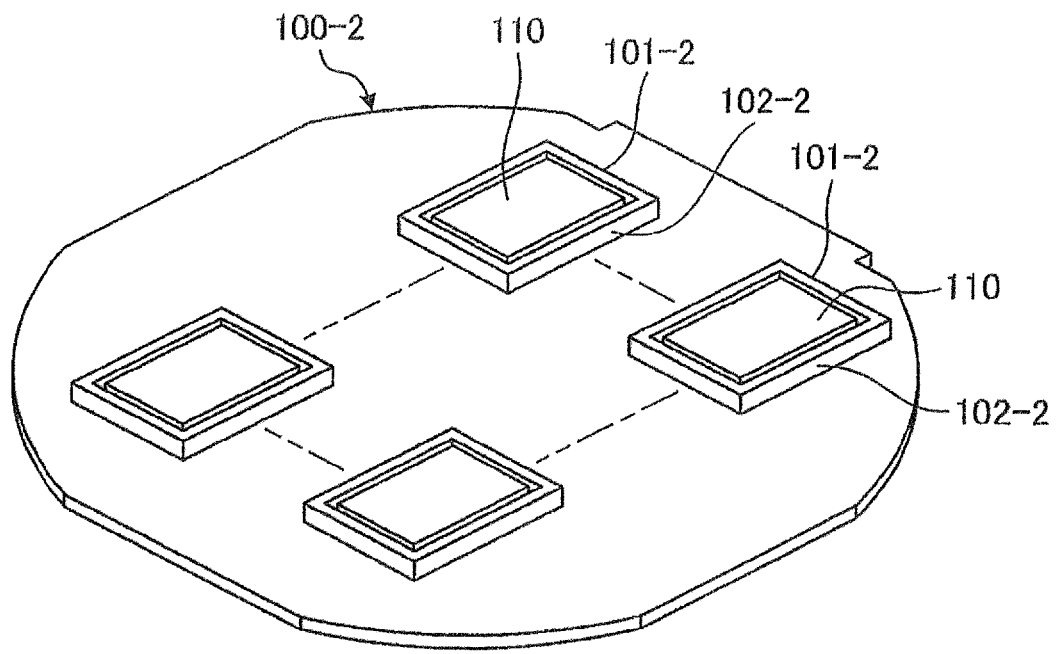
FIG. 29 is a perspective view of a transfer jig for use in performing the cutting blade changing method according to the second preferred embodiment.

A cutting blade changing method and a transfer jig according to a second preferred embodiment of the present invention will now be described with reference to the drawings. FIG. 28 is a perspective view of an essential part of a cutting apparatus for performing the cutting blade changing method according to the second preferred embodiment. FIG. 29 is a perspective view of the transfer jig according to the second preferred embodiment. In FIGS. 28 and 29, substantially the same parts as those of the first preferred embodiment are denoted by the same reference numerals, and the description thereof will be omitted.

Referring to FIG. 28, there is depicted a cutting apparatus 1-2 for performing the cutting blade changing method according to the second preferred embodiment. The cutting apparatus 1-2 includes a processing unit 2-2 having a pair of auxiliary chuck tables 111 for respectively mounting a pair of dressing boards 110. Referring to FIG. 29, there is depicted a transfer jig 100-2 according to the second preferred embodiment. The transfer jig 100-2 functions to transfer the dressing board 110 as a consumable component to each auxiliary chuck table 111 of the processing unit 2-2. The other configuration is the same as that of the first preferred embodiment.

Each auxiliary chuck table 111 functions to detachably mount the dressing board 110. Each auxiliary chuck table 111 is movable in the X direction together with the chuck table 10. Each auxiliary chuck table 111 is rectangular as viewed in plan and has an upper surface for mounting the dressing board 110. The upper surface of each auxiliary chuck table 111 is set at the same level as that of the holding surface 11 of the chuck table 10. Each auxiliary chuck table 111 is connected to a vacuum source (not depicted), so that when a vacuum produced by the vacuum source is applied to each auxiliary chuck table 111, the dressing board 110 placed on the upper surface of each auxiliary chuck table 111 is held under suction on each auxiliary chuck table 111. In the second preferred embodiment, the two auxiliary chuck tables 111 respectively correspond to the two cutting units 20, and the dressing board 110 held on each auxiliary chuck table 111 is suitable for the kind of the cutting blade 21 of the corresponding cutting unit 20.

Each dressing board 110 functions to dress the cutting blade 21 reduced in its cutting performance due to loading or dulling, thereby restoring the cutting performance of the cutting blade 21. Thus, dressing the cutting blade 21 means restoring the cutting performance of the cutting blade 21.

Each dressing board 110 is a rectangular plate having substantially the same shape as that of the upper surface of each auxiliary chuck table 111 as viewed in plan. Each dressing board 110 is configured by mixing abrasive grains such as WA (white alundum, or alumina) and GC (green carbonite, or silicon carbide) in a bond formed of resin or ceramic.

As depicted in FIG. 29, the transfer jig 100-2 according to the second preferred embodiment has a plurality of receiving portions 101-2 for respectively receiving a plurality of dressing boards 110. Each receiving portion 101-2 has a rectangular side wall 102-2, in which the outside shape of the rectangular space defined by the rectangular side wall 102-2 is the same as the outside shape of each dressing board 110 as viewed in plan. That is, the rectangular space defined by the rectangular side wall 102-2 is adapted to just receive each dressing board 110. The transfer jig 100-2 according to the second preferred embodiment can be stored into one of the slots 63 in the cassette 61 as similar to the annular frame 211 in the condition where the plural dressing boards 110 are received in the plural receiving portions 101-2, respectively. Further, the transfer jig 100-2 can be transferred by the transfer unit 80 as similar to the annular frame 211. That is, the transfer jig 100-2 is transferred between the cassette 61 and the chuck table 10 by using the transfer unit 80 for common use in transferring the workpiece 200.

The cutting apparatus 1-2 depicted in FIG. 28 includes a changing unit (not depicted) for changing the dressing board 110 held on each auxiliary chuck table 111. The changing unit does not include the nut holder 32 and includes the blade chuck 34 adapted to hold the dressing board 110 under suction. The other configuration of this changing unit is the same as that of the blade changing unit 3.

The cutting blade changing method and the transfer jig 100-2 according to the second preferred embodiment can exhibit an effect similar to that of the first preferred embodiment. That is, the dressing board 110 can be automatically supplied to the processing unit 2-2 by utilizing the transfer unit 80 for use in transferring the workpiece 200 without adding any special transfer mechanism. As a result, the number of steps required for replacement of the dressing board 110 can be reduced.

<First Modification>

Figure 30:
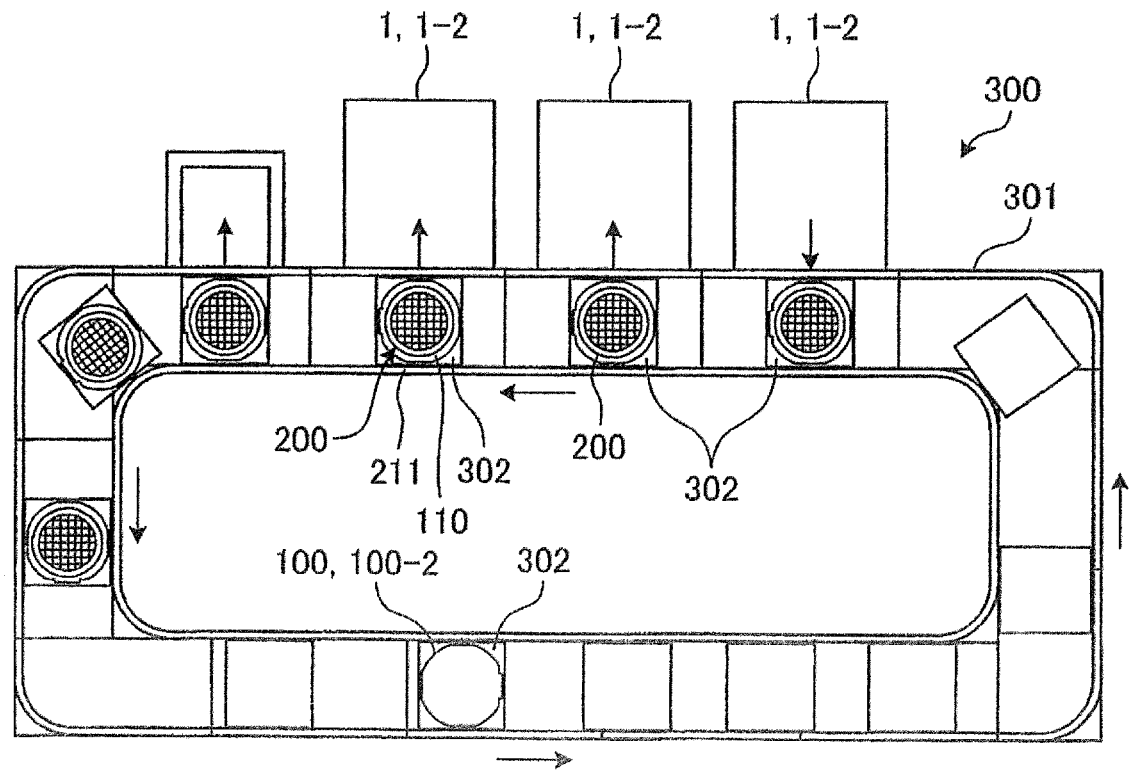
FIG. 30 is a plan view depicting the configuration of manufacturing equipment including a plurality of cutting apparatuses for performing a cutting blade changing method according to a first modification of the first and second preferred embodiments.

A cutting blade changing method and a transfer jig according to a first modification of the first and second preferred embodiments will now be described with reference to the drawings. FIG. 30 is a plan view depicting the configuration of manufacturing equipment including a plurality of cutting apparatuses for performing the cutting blade changing method according to the first modification. In FIG. 30, substantially the same parts as those of the first and second preferred embodiments are denoted by the same reference numerals, and the description thereof will be omitted.

In the cutting blade changing method according to the first modification, manufacturing equipment 300 including a plurality of cutting apparatuses 1 or 1-2 and a conveyor 301 for carrying a plurality of trays 302 are used, in which a transfer jig 100 or 100-2 and a plurality of workpieces 200 are held on the plural trays 302. The other configuration of the first modification is the same as those of the first and second preferred embodiments. In the first and second preferred embodiments mentioned above, the transfer jig 100 or 100-2 is supplied from the cassette 61 to the processing unit 2 or 2-2. In contrast thereto, in the first modification depicted in FIG. 30, the transfer jig 100 or 100-2 is supplied from one of the plural trays 302 to the processing unit 2 or 2-2, in which the plural trays 302 are circulated by the conveyor 301. In FIG. 30, the cutting blade 21 held on the transfer jig 100 or the dressing board 110 held on the transfer jig 100-2 is not depicted.

The cutting blade changing method and the transfer jig 100 or 100-2 according to the first modification can exhibit an effect similar to that of the first preferred embodiment. That is, the cutting blade 21 or the dressing board 110 can be automatically supplied to the processing unit 2 or 2-2 by utilizing the transfer unit 80 for use in transferring the workpiece 200 without adding any special transfer mechanism. As a result, the number of steps required for replacement of the cutting blade 21 or the dressing board 110 can be reduced.

<Second Modification>

Figure 31:
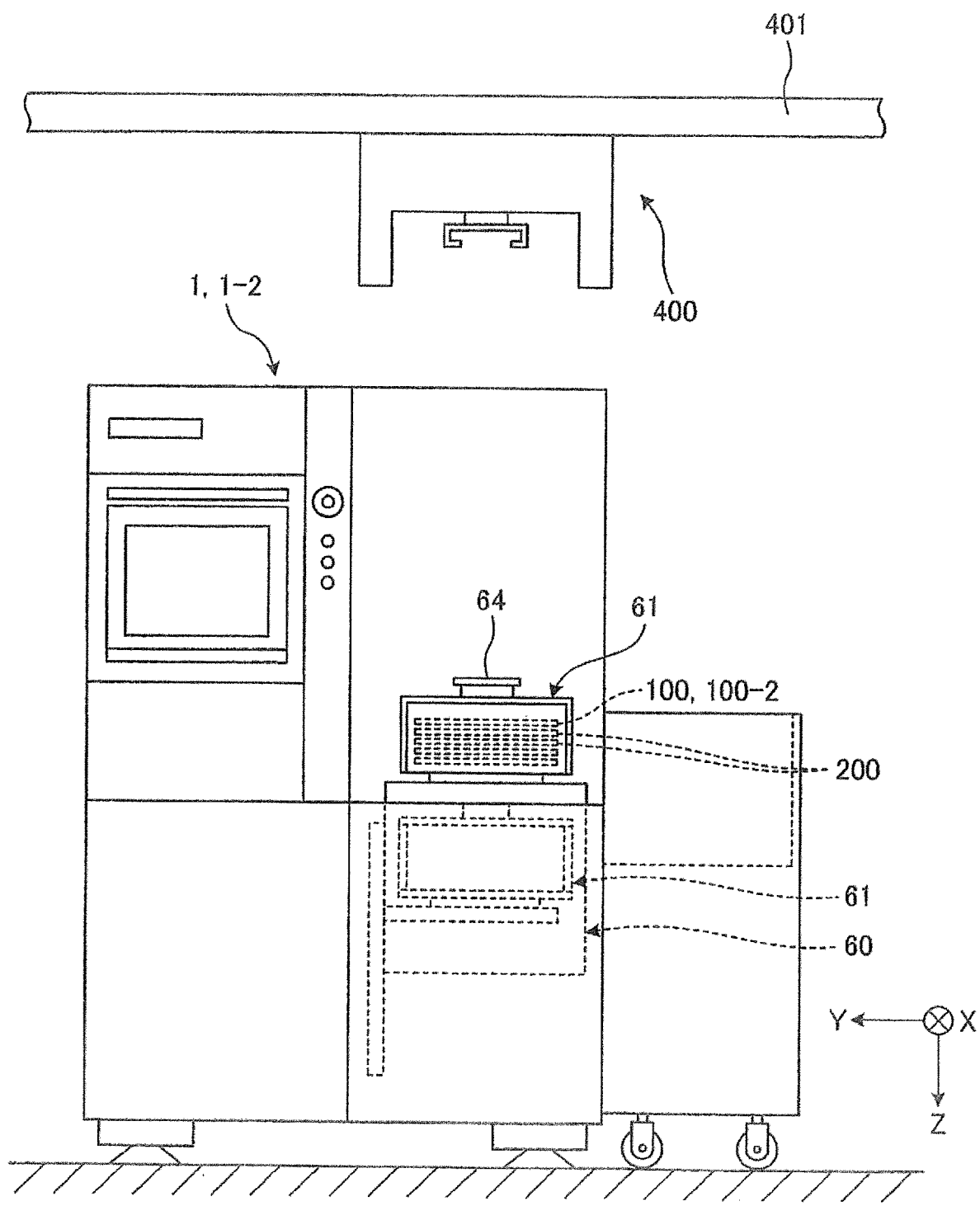
FIG. 31 is an elevational view depicting the configuration of a cutting apparatus and its peripheral equipment for performing a cutting blade changing method according to a second modification of the first and second preferred embodiments.

A cutting blade changing method and a transfer jig according to a second modification of the first and second preferred embodiments will now be described with reference to the drawings. FIG. 31 is an elevational view depicting the configuration of a cutting apparatus and its peripheral equipment for performing the cutting blade changing method according to the second modification. In FIG. 31, substantially the same parts as those of the first and second preferred embodiments are denoted by the same reference numerals, and the description thereof will be omitted.

In the cutting blade changing method according to the second modification, an automatic transfer system 400 depicted in FIG. 31 is used to supply a cassette 61 to the cutting apparatus 1 or 1-2. The other configuration is the same as those of the first and second preferred embodiments. The automatic transfer system 400 functions to transfer the cassette 61 storing the transfer jig 100 or 100-2 to/from the upper surface of the cassette elevator 60 of the cutting apparatus 1 or 1-2. In the second modification, the cassette 61 is provided with an upper projection 64.

In the second modification, the automatic transfer system 400 adopts an overhead hoist transfer (OHT) including a transfer path 401 provided on the ceiling of production equipment, a holding portion 402 adapted to travel along the transfer path 401 for holding the upper projection 64 of the cassette 61, and a control unit (not depicted) configured by a computer for controlling the traveling condition of the holding portion 402. In the second modification, another cassette 61 can be stored in the cassette elevator 60. That is, two cassettes 61 are vertically arranged so as to be spaced from each other in the Z direction. However, the present invention is not limited to the configuration depicted in FIG. 31. The lower cassette 61 depicted in FIG. 31 can be horizontally taken into/from the cassette elevator 60 through its side opening (not depicted). In the present invention, the automatic transfer system 400 is not limited to such an OHT, but may be any system using an unmanned transfer vehicle such as over head shuttle (OHS), automatic guided vehicle (AGV), and rail guided vehicle (RGV).

The cutting blade changing method and the transfer jig 100 or 100-2 according to the second modification can exhibit an effect similar to that of the first preferred embodiment. That is, the cutting blade 21 or the dressing board 110 can be automatically supplied to the processing unit 2 or 2-2 by utilizing the transfer unit 80 for use in transferring the workpiece 200 without adding any special transfer mechanism. AS a result, the number of steps required for replacement of the cutting blade 21 or the dressing board 110 can be reduced.

Furthermore, the cassette 61 storing the transfer jig 100 or 100-2 is transferred to/from the cutting apparatus 1 or 1-2 by the automatic transfer system 400 according to the second modification, so that the cutting blade 21 or the dressing board 110 as a consumable component can be automatically supplied.

<Third Modification>

Figure 32:
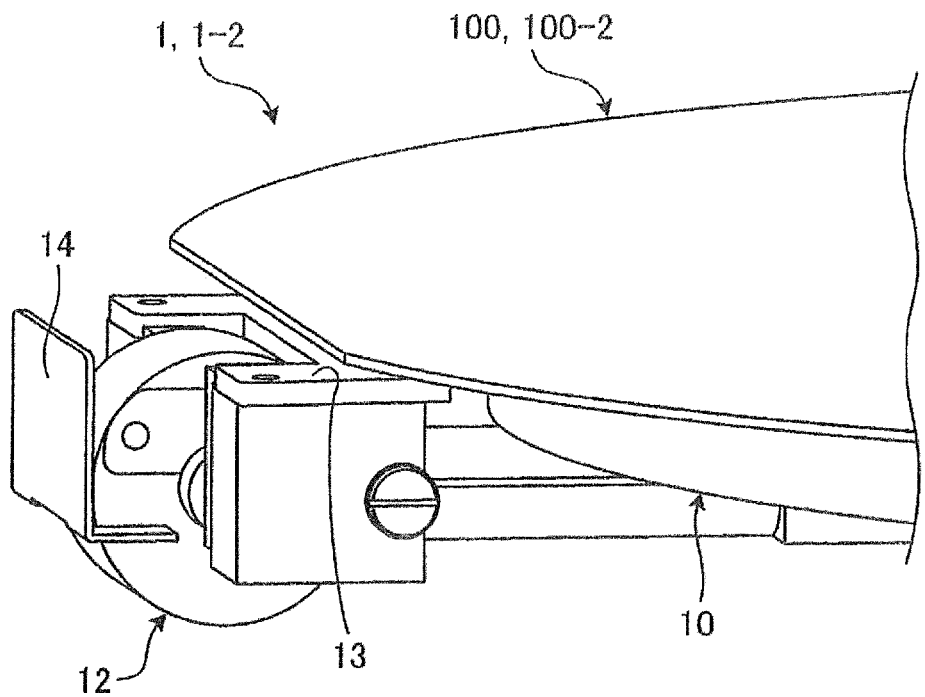
FIG. 32 is a perspective view depicting an essential part of a chuck table in a cutting apparatus for performing a cutting blade changing method according to a third modification of the first and second preferred embodiments.
Figure 33:
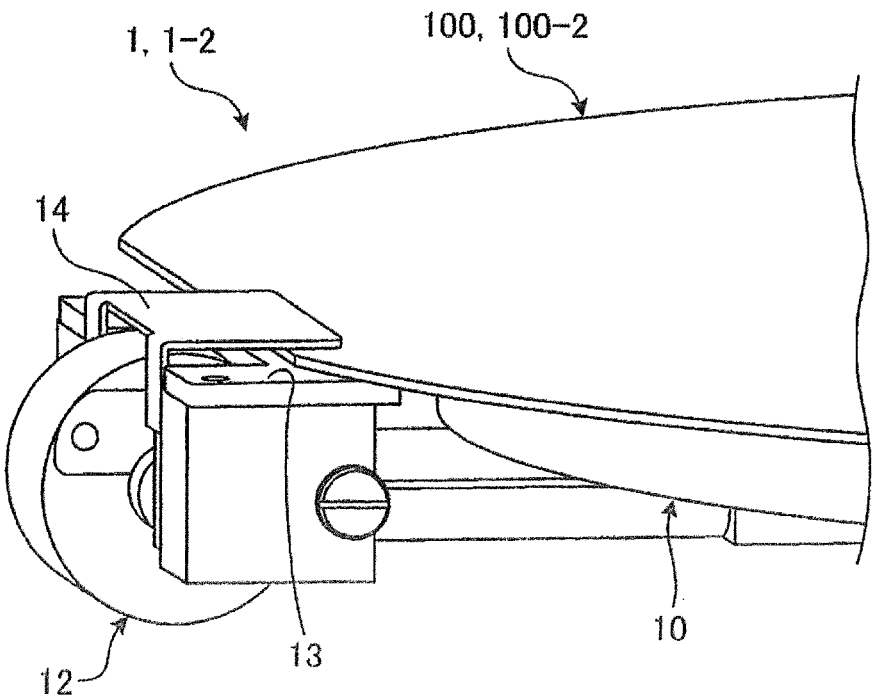
FIG. 33 is a perspective view similar to FIG. 32, depicting a condition where the transfer jig is held on the chuck table under suction.

A cutting blade changing method and a transfer jig according to a third modification of the first and second preferred embodiments will now be described with reference to the drawings. FIG. 32 is a perspective view depicting an essential part of a chuck table in a cutting apparatus for performing the cutting blade changing method according to the third modification. FIG. 33 is a perspective view similar to FIG. 32, depicting a condition where the transfer jig is held on the chuck table under suction. In FIGS. 32 and 33, substantially the same parts as those of the first and second preferred embodiments are denoted by the same reference numerals, and the description thereof will be omitted.

In the third modification, the cutting apparatus 1 or 1-2 does not include the transfer jig holding members 15 depicted in FIG. 32. The other configuration is the same as those of the first and second preferred embodiments. In the cutting apparatus 1 or 1-2 depicted in FIGS. 32 and 33, the transfer jig 100 or 100-2 is held on the holding surface 11 of the chuck table 10 under suction, and the peripheral portion of the transfer jig 100 or 100-2 is clamped by the clamps 12. In FIGS. 32 and 33, the cutting blades 21 held by the transfer jig 100 or the dressing boards 110 held by the transfer jig 100-2 are not depicted.

The cutting blade changing method and the transfer jig 100 or 100-2 according to the third modification can exhibit an effect similar to that of the first preferred embodiment. That is, the cutting blade 21 or the dressing board 110 can be automatically supplied to the processing unit 2 or 2-2 by utilizing the transfer unit 80 for use in transferring the workpiece 200 without adding any special transfer mechanism. As a result, the number of steps required for replacement of the cutting blade 21 or the dressing board 110 can be reduced.

<Fourth Modification>

Figure 34:
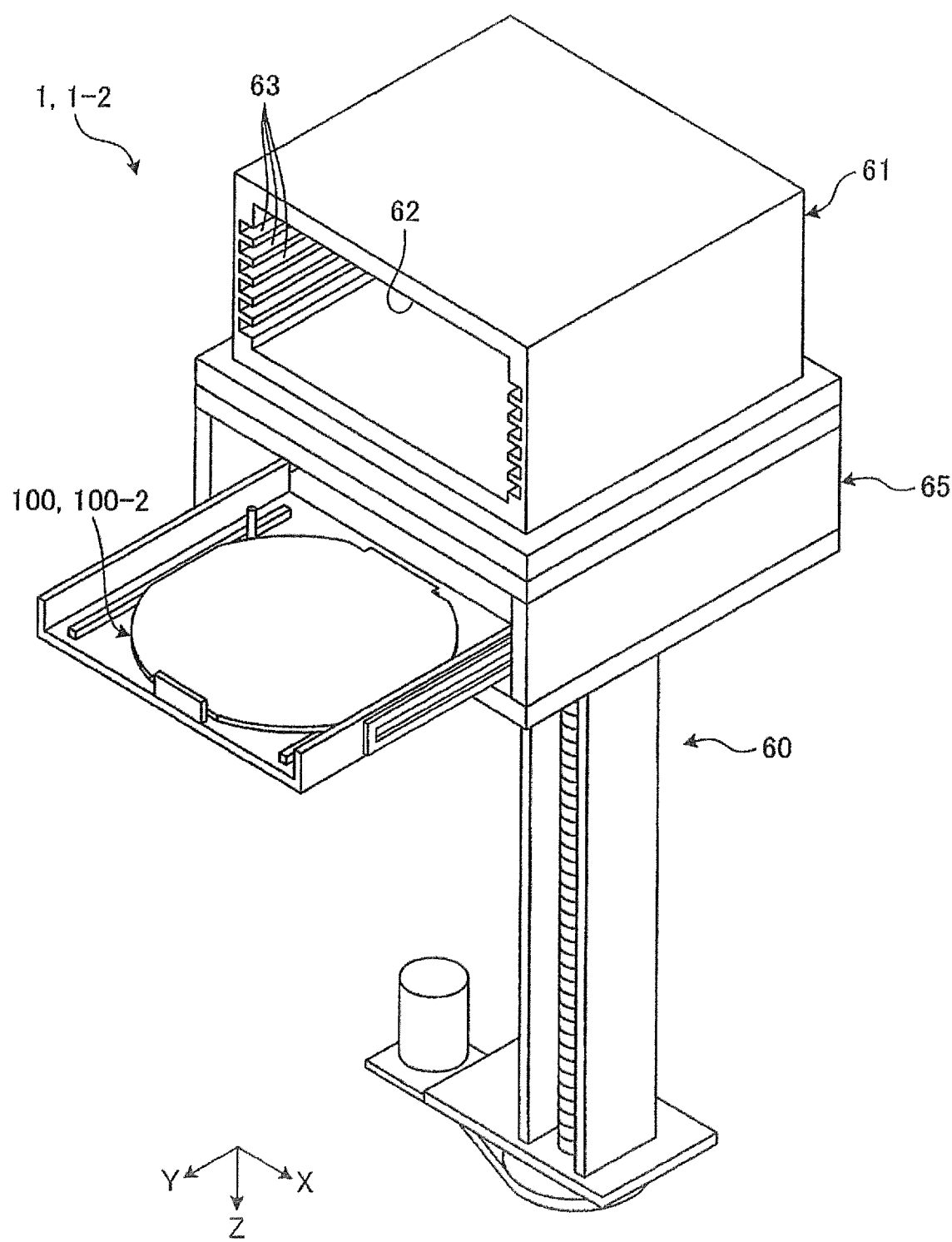
FIG. 34 is a perspective view depicting the configuration of a cassette elevator in a cutting apparatus for performing a cutting blade changing method according to a fourth modification of the first and second preferred embodiments.

A cutting blade changing method and a transfer jig according to a fourth modification of the first and second preferred embodiments will now be described with reference to the drawings. FIG. 34 is a perspective view depicting the configuration of a cassette elevator in a cutting apparatus for performing the cutting blade changing method according to the fourth modification. In FIG. 34, substantially the same parts as those of the first and second preferred embodiments are denoted by the same reference numerals, and the description thereof will be omitted.

In the cutting apparatus 1 or 1-2 depicted in FIG. 34, the cassette elevator 60 includes an inspection unit 65 for storing and inspecting the workpiece 200, and the transfer jig 100 or 100-2 is stored in the inspection unit 65. The other configuration is the same as those of the first and second preferred embodiments. In the cutting apparatus 1 or 1-2 depicted in FIG. 34, the transfer jig 100 or 100-2 is taken out of/into the inspection unit 65 of the cassette elevator 60. In FIG. 34, the cutting blades 21 held by the transfer jig 100 or the dressing board 110 held by the transfer jig 100-2 are not depicted.

The cutting blade changing method and the transfer jig 100 or 100-2 according to the fourth modification can exhibit an effect similar to that of the first preferred embodiment. That is, the cutting blade 21 or the dressing board 110 can be automatically supplied to the processing unit 2 or 2-2 by utilizing the transfer unit 80 for use in transferring the workpiece 200 without adding any special transfer mechanism. As a result, the number of steps required for replacement of the cutting blade 21 or the dressing board 110 can be reduced.

The present invention is not limited to the preferred embodiments and the modifications mentioned above, but various other modifications may be made without departing from the scope of the present invention. For example, while the transfer jig 100 holding the cutting blades 21 is stored in the cassette 61 in the first preferred embodiment and the transfer jig 100-2 holding the dressing boards 110 is stored in the cassette 61 in the second preferred embodiment, both the transfer jig 100 holding the cutting blades 21 and the transfer jig 100-2 holding the dressing boards 110 may be stored in the same cassette 61.

Further, while the cutting blade 21 is fixed to the spindle 23 by using the fastening nut 26 in the above preferred embodiments, each cutting unit 20 may include a vacuum spindle adapted to mount the cutting blade 21 by using a vacuum. In this case, the blade changing unit 3 may exclude the nut holder 32. Further, the nut holder 32 is configured so that the fastening nut 26 is held by the holding members 330, and the blade chuck 34 is configured so that the cutting blade 21 is held by using a vacuum in the above preferred embodiments. As a modification, both the nut holder 32 and the blade chuck 34 may employ holding members. Alternatively, both the nut holder 32 and the blade chuck 34 may use a vacuum.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. In a cutting apparatus including a base and a chuck table configured for holding a workpiece on a holding surface thereof, wherein the chuck table is configured and arranged to rotate with respect to the base about an axis of rotation, a processing unit having a spindle and a cutting blade detachably mounted on said spindle, transfer means supplying said workpiece to said processing unit, and cutting blade changing means changing said cutting blade;

a cutting blade changing method using a transfer jig having a plurality of receiving portions each adapted to receive a new cutting blade as a replacement component and said cutting blade changed by said cutting blade changing means, said cutting blade changing method comprising:

a transfer step of transferring said transfer jig previously stored in a cassette to said chuck table of said processing unit by using said transfer means to remove said transfer jig from said cassette in a condition where said new cutting blade is received in one of said plurality of receiving portions of said transfer jig, said transfer means also being used in transferring the workpiece;

a transfer jig holding step of holding said transfer jig above said chuck table by using transfer jig holding means to place said transfer jig above said chuck table after performing said transfer step, the transfer jig being held above said chuck table by the transfer jig holding means such that a straight line, which extends parallel to the axis of rotation about which the chuck table rotates, intersects each of the transfer jig and the chuck table;

a removing step of removing said cutting blade from said processing unit by using said cutting blade changing means and next placing said removed cutting blade into another one of said plurality of receiving portions of said transfer jig, after performing said transfer jig holding step;

a mounting step of taking said new cutting blade from said one of said plurality of receiving portions of said transfer jig by using said cutting blade changing means and next mounting said new cutting blade to said processing unit, after performing said removing step; and a returning step of returning said transfer jig from said processing unit to said cassette by using said transfer means in a condition where said cutting blade removed from said processing unit is received in said another one of said plurality of receiving portions of said transfer jig, after performing said mounting step.

2. The cutting blade changing method according to claim 1, wherein:
said new cutting blade and said removed cutting blade each include a respective central mounting hole; and
said plurality of receiving portions each comprise a respective cylindrical wall and a respective positioning projection formed within the associated cylindrical wall, wherein said positioning projection is configured and arranged to receive said central mounting hole of one of said new cutting blade and said removed cutting blade.

3. The cutting blade changing method according to claim 1, wherein said transfer means includes a pair of transfer arms that are each connected to an arm portion.

4. The cutting blade changing method according to claim 1, wherein:
said workpiece comprises a semiconductor wafer, and further wherein said semiconductor wafer is supported by an annular frame via adhesive tape; and
said cassette includes a plurality of slots that are each configured to receive either said annular frame or said transfer jig.

5. The cutting blade changing method according to claim 1, wherein said cassette is configured and arranged for storing said workpiece and said transfer jig.

6. A cutting blade changing method for use with a cutting apparatus that includes a base and a chuck table configured for holding a workpiece on a holding surface thereof, wherein the chuck table is configured and arranged to rotate with respect to the base about an axis of rotation, a processing unit having a spindle and a cutting blade detachably mounted on said spindle, transfer means for supplying said workpiece to said processing unit, and cutting blade changing means for changing said cutting blade, said cutting blade changing method using a transfer jig having a plurality of receiving portions that are each adapted to receive either a new cutting blade as a replacement component or said cutting blade changed by said cutting blade changing means, said cutting blade changing method comprising:
a transfer step of transferring said transfer jig previously stored in a cassette to said chuck table of said processing unit by using said transfer means to remove said transfer jig from said cassette in a condition where said new cutting blade is received in one of said plurality of receiving portions of said transfer jig, said transfer means also being used in transferring the workpiece;
a transfer jig holding step of holding said transfer jig above said chuck table by using transfer jig holding means to place said transfer jig above said chuck table after performing said transfer step, the transfer jig being held above said chuck table by the transfer jig holding means such that a straight line, which extends parallel to the axis of rotation about which the chuck table rotates, intersects each of the transfer jig and the chuck table;
a removing step of removing said cutting blade from said processing unit by using said cutting blade changing means and next placing said removed cutting blade into another one of said plurality of receiving portions of said transfer jig, after performing said transfer jig holding step;

a mounting step of taking said new cutting blade from said one of said plurality of receiving portions of said transfer jig by using said cutting blade changing means and next mounting said new cutting blade to said processing unit, after performing said removing step; and a returning step of returning said transfer jig from said processing unit to said cassette by using said transfer means in a condition where said cutting blade removed from said processing unit is received in said another one of said plurality of receiving portions of said transfer jig, after performing said mounting step.

7. The cutting blade changing method according to claim 6, wherein:
said new cutting blade and said removed cutting blade each include a respective central mounting hole; and
said plurality of receiving portions each comprise a respective cylindrical wall and a respective positioning projection formed within the associated cylindrical wall, wherein said positioning projection is configured and arranged to receive said central mounting hole of one of said new cutting blade and said removed cutting blade.

8. The cutting blade changing method according to claim 6, wherein said transfer means includes a pair of transfer arms that are each connected to an arm portion.

9. The cutting blade changing method according to claim 6, wherein:
said workpiece comprises a semiconductor wafer, and further wherein said semiconductor wafer is supported by an annular frame via adhesive tape; and
said cassette includes a plurality of slots that are each configured to receive either said annular frame or said transfer jig.

10. The cutting blade changing method according to claim 6, wherein said cassette is configured and arranged for storing said workpiece and said transfer jig.

11. In a cutting apparatus including a chuck table holding a workpiece, a processing unit having a spindle and a cutting blade detachably mounted on said spindle, transfer means supplying said workpiece to said processing unit, and cutting blade changing means changing said cutting blade:
a cutting blade changing method using a transfer jig having a plurality of receiving portions each adapted to receive a new cutting blade as a replacement component and said cutting blade changed by said cutting blade changing means, said cutting blade changing method comprising:
a transfer step of transferring said transfer jig previously stored in a cassette to said chuck table of said processing unit by using said transfer means to remove said transfer jig from said cassette in a condition where said new cutting blade is received in one of said plurality of receiving portions of said transfer jig;
a transfer jig holding step of holding said transfer jig above said chuck table by using transfer jig holding means to place said transfer jig above said chuck table after performing said transfer step;
a removing step of removing said cutting blade from said processing unit by using said cutting blade changing means and next placing said removed cutting blade into another one of said plurality of receiving portions of said transfer jig, after performing said transfer jig holding step;

a mounting step of taking said new cutting blade from said one of said plurality of receiving portions of said transfer jig by using said cutting blade changing means and next mounting said new cutting blade to said processing unit, after performing said removing step; and a returning step of returning said transfer jig from said processing unit to said cassette by using said transfer means in a condition where said cutting blade removed from said processing unit is received in said another one of said plurality of receiving portions of said transfer jig, after performing said mounting step, wherein said cutting blade changing means includes a rotating portion configured and arranged to be rotated about a central axis, a blade chuck that is configured and arranged for holding either said new cutting blade or said removed cutting blade under suction, and a nut holder that is configured and arranged for removing and installing a fastening nut that attaches said new or removed cutting blade to said spindle of said processing unit, wherein said blade chuck and said nut holder are both attached to said rotating portion for rotation therewith.

12. A cutting blade changing method for use with a cutting apparatus that includes a chuck table holding a workpiece, a processing unit having a spindle and a cutting blade detachably mounted on said spindle, transfer means for supplying said workpiece to said processing unit, and cutting blade changing means for changing said cutting blade, said cutting blade changing method using a transfer jig having a plurality of receiving portions that are each adapted to receive either a new cutting blade as a replacement component or said cutting blade changed by said cutting blade changing means, said cutting blade changing method comprising:

a transfer step of transferring said transfer jig previously stored in a cassette to said chuck table of said processing unit by using said transfer means to remove said transfer jig from said cassette in a condition where said new cutting blade is received in one of said plurality of receiving portions of said transfer jig;

a transfer jig holding step of holding said transfer jig above said chuck table by using transfer jig holding means to place said transfer jig above said chuck table after performing said transfer step;

a removing step of removing said cutting blade from said processing unit by using said cutting blade changing means and next placing said removed cutting blade into another one of said plurality of receiving portions of said transfer jig, after performing said transfer jig holding step;

a mounting step of taking said new cutting blade from said one of said plurality of receiving portions of said transfer jig by using said cutting blade changing means and next mounting said new cutting blade to said processing unit, after performing said removing step; and a returning step of returning said transfer jig from said processing unit to said cassette by using said transfer means in a condition where said cutting blade removed from said processing unit is received in said another one of said plurality of receiving portions of said transfer jig, after performing said mounting step, wherein said cutting blade changing means includes a rotating portion configured and arranged to be rotated about a central axis, a blade chuck that is configured and arranged for holding either said new cutting blade or said removed cutting blade under suction, and a nut holder that is configured and arranged for removing and installing a fastening nut that attaches said new or removed cutting blade to said spindle of said processing unit, wherein said blade chuck and said nut holder are both attached to said rotating portion for rotation therewith.

\* \* \* \* \*